(12) United States Patent
Xu et al.

(10) Patent No.: US 11,910,485 B2
(45) Date of Patent: Feb. 20, 2024

(54) MOBILITY MANAGEMENT METHOD AND APPARATUS

(71) Applicant: Huawei Technologies Co., Ltd., Shenzhen (CN)

(72) Inventors: Changchun Xu, Shanghai (CN); Bo Lin, Shenzhen (CN); Yan Wang, Shanghai (CN); Shikun Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 213 days.

(21) Appl. No.: 17/388,980

(22) Filed: Jul. 29, 2021

(65) Prior Publication Data
US 2021/0360392 A1  Nov. 18, 2021

Related U.S. Application Data

(63) Continuation of application No. PCT/CN2019/128854, filed on Dec. 26, 2019.

(30) Foreign Application Priority Data

Jan. 30, 2019 (CN) .......................... 201910090953.4

(51) Int. Cl.
  *H04W 8/30* (2009.01)
  *H04W 8/12* (2009.01)
  (Continued)

(52) U.S. Cl.
  CPC ............... *H04W 8/30* (2013.01); *H04W 8/12* (2013.01); *H04W 40/36* (2013.01); *H04W 80/02* (2013.01)

(58) Field of Classification Search
  CPC ......... H04W 8/30; H04W 8/12; H04W 40/36; H04W 80/02; H04W 84/12; H04W 8/26;
  (Continued)

(56) References Cited

U.S. PATENT DOCUMENTS

2018/0270791 A1  9/2018  Park et al.
2020/0228936 A1* 7/2020  Talebi Fard .......... H04W 8/186
(Continued)

FOREIGN PATENT DOCUMENTS

CN  103686888 A  3/2014
CN  105338127 A  2/2016
(Continued)

OTHER PUBLICATIONS

3GPP TR23.734 (3GPP TR 23.734 V16.0.0 (Dec. 2018), Rel.16), Title: 3rd Generation Partnership Project; Technical Specification Group Services and System Aspects; Study on enhancement of 5GS for Vertical and LAN Services (Release 16). (Year: 2018).*
(Continued)

*Primary Examiner* — Mohammed S Chowdhury
(74) *Attorney, Agent, or Firm* — Leydig, Voit & Mayer, Ltd.

(57) ABSTRACT

A mobility management method and apparatus are provided, to flexibly switch a forwarding path, and ensure service continuity in a movement process of a terminal device. The method includes: A control plane network element determines a changed media access control address MAC address of a first terminal device after the first terminal device moves. Then, the control plane network element determines at least one second terminal device that belongs to a same terminal device group as the first terminal device, where the first terminal device is a terminal device whose address changes after the movement, and the at least one second terminal device is a terminal device other than the first terminal device in the terminal device group. Finally, the control plane network element notifies the first terminal device and the at least one second terminal device to update to the changed MAC address of the first terminal device.

16 Claims, 19 Drawing Sheets

(51) Int. Cl.
H04W 40/36 (2009.01)
H04W 80/02 (2009.01)

(58) Field of Classification Search
CPC ............................ H04W 36/10; H04W 36/12; H04L 2101/622; H04L 61/5038
See application file for complete search history.

(56) References Cited

U.S. PATENT DOCUMENTS

| | | | | |
|---|---|---|---|---|
| 2020/0351980 | A1* | 11/2020 | Talebi Fard | .......... H04W 68/00 |
| 2020/0351984 | A1* | 11/2020 | Talebi Fard | .......... H04W 72/30 |
| 2021/0409941 | A1* | 12/2021 | Rajendran | ............ H04W 12/06 |
| 2022/0117015 | A1* | 4/2022 | DeFoy | .................. H04W 76/11 |
| 2022/0150166 | A1* | 5/2022 | Yang | ........................ H04L 45/74 |

FOREIGN PATENT DOCUMENTS

| | | |
|---|---|---|
| CN | 105591936 A | 5/2016 |
| CN | 106034299 A | 10/2016 |
| CN | 107135499 A | 9/2017 |
| CN | 107360565 A | 11/2017 |
| CN | 108012287 A | 5/2018 |
| CN | 105325031 B | 1/2020 |
| WO | 2006011493 A1 | 2/2006 |
| WO | 2015153214 A1 | 10/2015 |
| WO | 2016032385 A1 | 3/2016 |

OTHER PUBLICATIONS

SA WG2 Meeting #130; S2-1900367; Source: InterDigital Inc.; Title: IP/MAC addresses update over a 5GLAN connection to support indirect communications mode; Jan. 21-25, 2019, Kochi. (Year: 2019).*

SA WG2 Meeting #130; S2-1900365; Source: Interdigital Inc.; Title: Mobility and other Consideration in a 5GLAN-Type Unified Architecture; Jan. 21-25, 2019, Kochi, India. (Year: 2019).*

SA WG2 Meeting #128-bis ; S2-187937; Source: vivo; Title: Solution for how to support 5G LAN group communication; Aug. 20-24, 2018, Sophia Antipolis, France. (Year: 2018).*

Ericsson, "MAC address change," 3GPP TSG-CT WG3 Meeting #97Bis, Sophia Antipolis, France, C3-184462, total 11 pages, 3rd Generation Partnership Project, Valbonne, France (Jul. 9-13, 2018).

Nokia, Nokia Shanghai Bell, "Ethernet PDU Session Re-Anchor," SA WG2 Meeting #128-Bis, Sophia Antipolis, S2-188399, total 7 pages (Aug. 20-24, 2018).

Huawei, HiSilicon, "Simultaneous Data Transmission in Inter-eNB Handover," 3GPP TSG-RAN WG2 Meeting #94, Nanjing, P.R. China, R2-163657, total 4 pages, 3rd Generation Partnership Project, Valbonne, France (May 23-27, 2016).

Huawei, HiSilicon, "Solution for KI#4 and KI#5: Basic architecture for supporting dynamic 5G LAN-type service and 5GLAN communication," 3GPP TSG-SA WG2 Meeting #128bis, Sophia Antipolis, France, S2-189054, total 3 pages (Aug. 20-24, 2018).

"3rd Generation Partnership Project; Technical Specification Group Services and System Aspects; Study on enhancement of 5GS for Vertical and LAN Services(Release 16)," 3GPP TR 23.734 V16.0.0, 3rd Generation Partnership Project, Valbonne, France, total 107 pages (Dec. 2018).

"3rd Generation Partnership Project; Technical Specification Group Services and System Aspects; Study on Communication for Automation in Vertical Domains(Release 16)," 3GPP TR 22.804 V16.2.0, total 196 pages, 3rd Generation Partnership Project, Valbonne, France (Dec. 2018).

"3rd Generation Partnership Project; Technical Specification Group Services and System Aspects; Procedures for the 5G System; Stage 2(Release 15)," 3GPP TS 23.502 V15.4.1, 3rd Generation Partnership Project, Valbonne, France, total 347 pages (Jan. 2019).

"Update to Solution for 5GLAN Group Communication, to support mobility procedures within a 5GLAN," SA WG2 Meeting #129bis, S2-1812398, West Palm Beach, FL, XP051563911, Total 8 pages, 3rd Generation Partnership Project, Valbonne, France (Nov. 26-30, 2018).

Inoue et al., "Transient MAC Address Scheme for Untraceability and DOS Attack Resiliency on Wireless Network," 2005 Wireless Telecommunications Symposium, XP010846545, pp. 15-23, Institute of Electrical and Electronics Engineers, New York, New York (Apr. 2005).

* cited by examiner

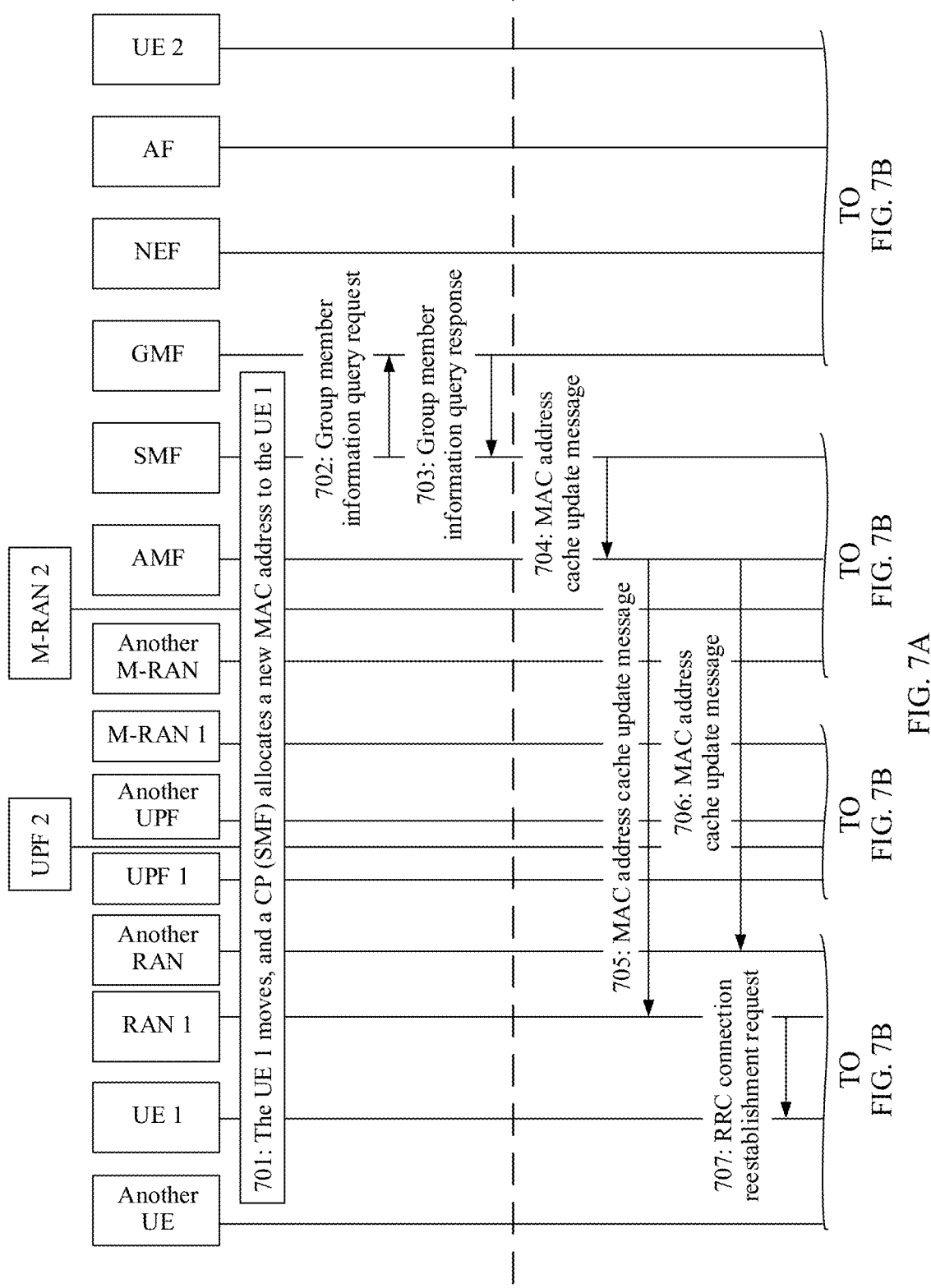

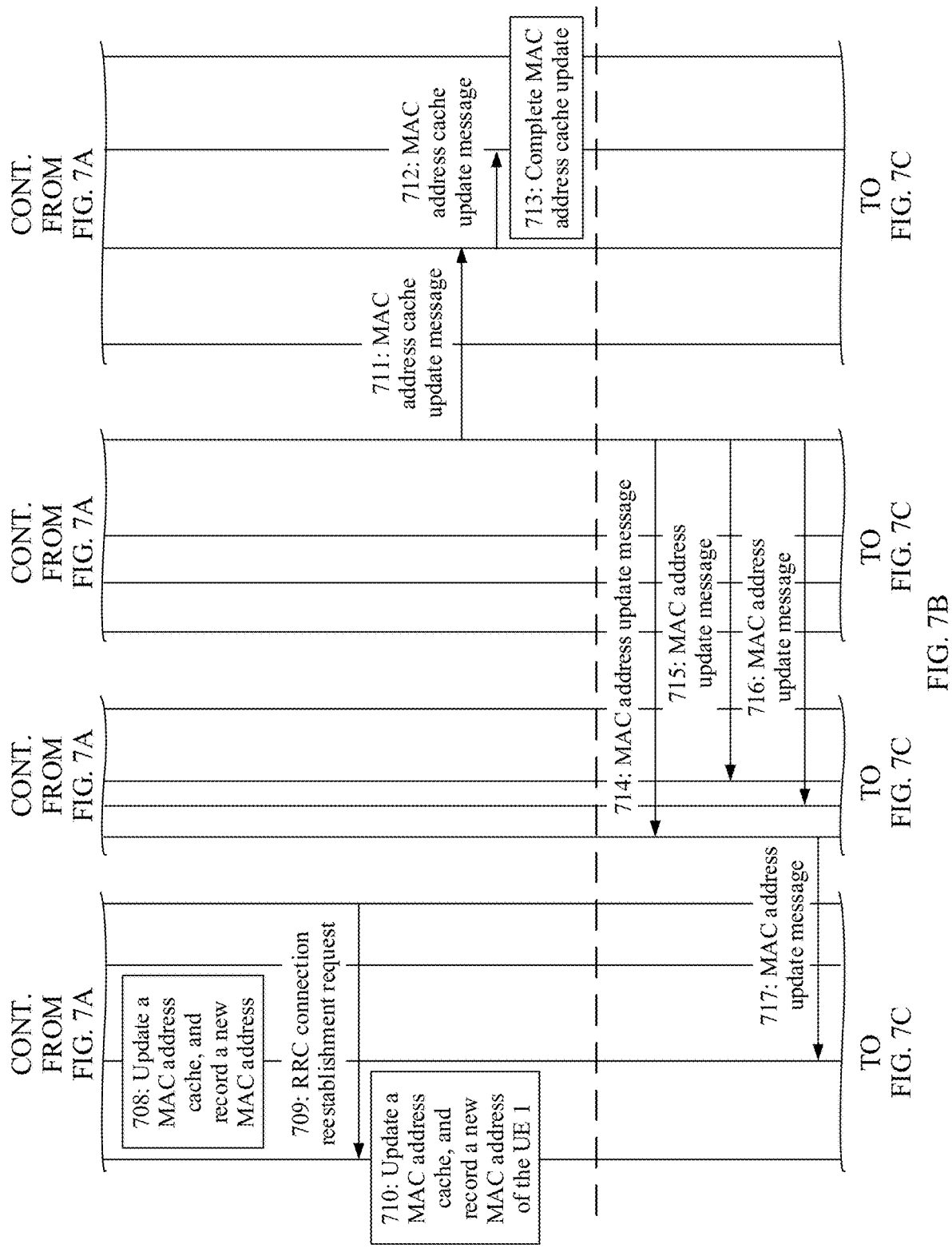

MOBILITY MANAGEMENT METHOD AND APPARATUS

CROSS-REFERENCE TO RELATED APPLICATIONS

This application is a continuation of International Application No. PCT/CN2019/128854, filed on Dec. 26, 2019, which claims priority to Chinese Patent Application No. 201910090953.4, filed on Jan. 30, 2019. The disclosures of the aforementioned applications are hereby incorporated by reference in their entireties.

TECHNICAL FIELD

This application relates to the field of communications technologies, and in particular, to a mobility management method and apparatus.

BACKGROUND

In industrial networks, Ethernet is a basis of an industrial Ethernet protocol. Supporting the Ethernet helps 3GPP implement an industrial control network. In the Ethernet, during service communication between terminal devices, after a terminal device moves, the terminal device needs to be handed over to a new access device, and a forwarding path of an external switching network also needs to be switched, to entirely update an end-to-end forwarding path.

Currently, when the terminal device moves, a network-wide media access control (MAC) address forwarding table needs to be updated to switch the forwarding path. However, actually, a MAC address forwarding table is modified when each terminal device moves, and causing a waste of resources. In addition, in a process of modifying the MAC address forwarding table, there is a high possibility that the modification fails or the modification is incomplete, and service continuity cannot be ensured. Therefore, the foregoing method cannot be used to flexibly implement the switching of the forwarding path.

Currently, a method is required to flexibly implement the switching of the forwarding path, and ensure the service continuity in the movement process of the terminal device.

SUMMARY

Embodiments of this application provide a mobility management method and apparatus, to flexibly switch a forwarding path, and ensure service continuity in a movement process of a terminal device.

According to a first aspect, this application provides a mobility management method, and the method includes: A control plane network element determines a changed media access control address MAC address of a first terminal device after the first terminal device moves. The control plane network element determines at least one second terminal device that belongs to a same terminal device group as the first terminal device, and notifies the first terminal device and the at least one second terminal device to update to the changed MAC address of the first terminal device, where the first terminal device is a terminal device whose address changes after the movement, and the at least one second terminal device is a terminal device other than the first terminal device in the terminal device group.

According to the foregoing method, the control plane network element only needs to determine the MAC address of the terminal device that moves, and notify the corresponding terminal device to update, and does not need to change a MAC address forwarding table in a system, thereby flexibly switching a forwarding path, and ensuring service continuity in a movement process of the terminal device.

In a possible design, a specific method for determining, by the control plane network element, the at least one second terminal device that belongs to the same terminal device group as the first terminal device may include: The control plane network element queries, from a group management function network element, member information of the terminal device group to which the first terminal device belongs, where the member information includes identifiers of all terminal devices included in the terminal device group. Then, the control plane network element determines the at least one second terminal device based on the member information.

According to the foregoing method, the control plane network element may accurately determine the at least one second terminal device that belongs to the same terminal device group as the first terminal device.

In a possible design, a specific method for notifying, by the control plane network element, the first terminal device to update to the changed MAC address of the first terminal device may include:

The control plane network element sends first address update information to the first terminal device through a first device, where the first address update information includes the changed MAC address of the first terminal device, and the first device is a target access device after the first terminal device moves; or the control plane network element sends second address update information to the first terminal device through a second device, where the second address update information includes the changed MAC address of the first terminal device, and the second device is a target user plane function network element after the first terminal device moves, or the second device is a target integrated device after the first terminal device moves, where the target integrated device is a device in which an access device and a user plane function network element are integrated.

According to the foregoing method, the control plane network element may flexibly notify, by using different methods based on different situations, the first terminal device to update to the changed MAC address of the first terminal device.

In a possible design, when a second terminal device is a terminal device that performs access by using a 3GPP network, a specific method for notifying, by the control plane network element, the at least one second terminal device to update to the changed MAC address of the first terminal device may include: The control plane network element sends third address update information to the second terminal device through an access device currently accessed by a second terminal device, where the third address update information includes the changed MAC address of the first terminal device.

According to the foregoing method, the control plane network element may successfully notify, based on an actual situation, the at least one second terminal device to update to the changed MAC address of the first terminal device.

In a possible design, when a second terminal device is a terminal device that performs access by using a fixed network, a specific method for notifying, by the control plane network element, the at least one second terminal device to update to the changed MAC address of the first terminal device may include: The control plane network element sends fourth address update information to the second terminal device through a network exposure function network element, where the fourth address update information includes the changed MAC address of the first terminal device.

According to the foregoing method, the control plane network element may successfully notify, based on an actual situation, the at least one second terminal device to update to the changed MAC address of the first terminal device.

In a possible design, a specific method for notifying, by the control plane network element, the at least one second terminal device to update to the changed MAC address of the first terminal device may include: The control plane network element sends fifth address update information to the second terminal device through a third device, where the fifth address update information includes the changed MAC address of the first terminal device, and the third device is a user plane function network element currently accessed by a second terminal device, or the third device is an integrated device currently accessed by a second terminal device, where the integrated device is a device in which an access device and a user plane function network element are integrated.

According to the foregoing method, the control plane network element may accurately notify the at least one second terminal device to update to the changed MAC address of the first terminal device.

In a possible design, the control plane network element initiates a procedure of releasing an original MAC address of the first terminal device, where the original MAC address of the first terminal device is a MAC address before the first terminal device moves. In this way, resource occupation can be reduced, and resource waste can be avoided.

According to a second aspect, this application provides a mobility management method, applied to a scenario in which a terminal device moves, and the method includes: After obtaining, from a control plane network element, a notification of updating to a changed MAC address of a first terminal device, the first terminal device updates a MAC address to the changed MAC address of the first terminal device.

According to the foregoing method, only the changed MAC address of the terminal device that moves needs to be updated, and a MAC address forwarding table in a system does not need to be changed, thereby flexibly switching a forwarding path, and ensuring service continuity in a movement process of the terminal device.

In a possible design, a specific method for obtaining, by the first terminal device from the control plane network element, the notification of updating to the changed MAC address of the first terminal device may include:

The first terminal device receives first address update information sent by the control plane network element through a first device, where the first address update information includes the changed MAC address of the first terminal device, and the first device is a target access device after the first terminal device moves; or the first terminal device receives second address update information sent by the control plane network element through a second device, where the second address update information includes the changed MAC address of the first terminal device, and the second device is a target user plane function network element after the first terminal device moves, or the second device is the target integrated device after the first terminal device moves, where the target integrated device is a device in which an access device and a user plane function network element are integrated.

According to the foregoing method, the first terminal device may accurately obtain the notification of updating to the changed MAC address of the first terminal device, so that the MAC address of the first terminal device is subsequently updated to the changed MAC address.

According to a third aspect, this application provides a mobility management method, applied to a scenario in which a terminal device moves, and the method may include: After obtaining, from a control plane network element, a notification of updating to a changed MAC address of the first terminal device, a second terminal device updates a cached MAC address of the first terminal device to the changed MAC address of the first terminal device.

According to the foregoing method, only the changed MAC address of the terminal device that moves needs to be updated, and a MAC address forwarding table in a system does not need to be changed, thereby flexibly switching a forwarding path, and ensuring service continuity in a movement process of the terminal device.

In a possible design, when the second terminal device is a terminal device that performs access by using a 3GPP network, a specific method for obtaining, by the second terminal device from the control plane network element, the notification of updating to the changed MAC address of the first terminal device may include: The second terminal device receives third address update information sent by the control plane network element through an access device currently accessed by the second terminal device, where the third address update information includes the changed MAC address of the first terminal device.

According to the foregoing method, the second terminal device may accurately obtain the notification of updating to the changed MAC address of the first terminal device, so that the MAC of the first terminal device is subsequently updated to the changed MAC address.

In a possible design, when the second terminal device is a terminal device that performs access by using a fixed network, a specific method for obtaining, by the second terminal device from the control plane network element, the notification of updating to the changed MAC address of the first terminal device may include: The second terminal device receives fourth address update information sent by the session management function network element through a network exposure function network element, where the fourth address update information includes the changed MAC address of the first terminal device.

According to the foregoing method, the second terminal device may accurately obtain the notification of updating to the changed MAC address of the first terminal device, so that the MAC of the first terminal device is subsequently updated to the changed MAC address.

In a possible design, a specific method for obtaining, by the second terminal device from the control plane network element, the notification of updating to the changed MAC address of the first terminal device may include: The second terminal device receives fifth address update information sent by the control plane network element through a third device, where the fifth address update information includes the changed MAC address of the first terminal device, and the third device is a user plane function network element currently accessed by the second terminal device, or the third device is an integrated device currently accessed by the second terminal device, where the integrated device is a device in which an access device and a user plane function network element are integrated.

According to the foregoing method, the second terminal device may accurately obtain the notification of updating to the changed MAC address of the first terminal device, so that the MAC of the first terminal device is subsequently updated to the changed MAC address.

According to a fourth aspect, this application further provides a control plane network element. The control plane network element has a function of implementing the control plane network element in the method example in the first aspect. The function may be implemented by hardware, or may be implemented by hardware by executing corresponding software. The hardware or the software includes one or more modules corresponding to the function.

In a possible design, a structure of the control plane network element includes a processing unit and a transceiver unit. The units may perform corresponding functions in the method example in the first aspect. For details, refer to the detailed descriptions in the method example. Details are not described herein again.

In a possible design, a structure of the control plane network element includes a transceiver and a processor, and optionally may further include a memory. The transceiver is configured to transmit and receive data, and is configured to communicate and interact with another device in a communication system. The processor is configured to support the control plane network element in performing a corresponding function in the method in the first aspect. The memory is coupled to the processor, and stores program instructions and data that are necessary for the control plane network element.

According to a fifth aspect, this application further provides a first terminal device. The first terminal device has a function of implementing the first terminal device in the method example in the second aspect. A function may be implemented by hardware, or may be implemented by hardware by executing corresponding software. The hardware or the software includes one or more modules corresponding to the function.

In a possible design, a structure of the first terminal device includes a transceiver unit and a processing unit. The units may perform corresponding functions in the method example in the second aspect. For details, refer to the detailed descriptions in the method example. Details are not described herein again.

In a possible design, a structure of the first terminal device includes a transceiver and a processor, and optionally may further include a memory. The transceiver is configured to transmit and receive data, and is configured to communicate and interact with another device in a communication system. The processor is configured to support the first terminal device in performing a corresponding function in the method in the second aspect. The memory is coupled to the processor, and stores program instructions and data that are necessary for the first terminal device.

According to a sixth aspect, this application further provides a second terminal device. The second terminal device has a function of implementing the second terminal device in the method example in the third aspect. A function may be implemented by hardware, or may be implemented by hardware by executing corresponding software. The hardware or the software includes one or more modules corresponding to the function.

In a possible design, a structure of the second terminal device includes a transceiver unit and a processing unit. The units may perform corresponding functions in the method example in the third aspect. For details, refer to the detailed descriptions in the method example. Details are not described herein again.

In a possible design, a structure of the second terminal device includes a transceiver and a processor, and optionally may further include a memory. The transceiver is configured to transmit and receive data, and is configured to communicate and interact with another device in a communication system. The processor is configured to support the second terminal device in performing a corresponding function in the method in the third aspect. The memory is coupled to the processor, and stores program instructions and data that are necessary for the second terminal device.

According to a seventh aspect, this application further provides a communication system. The communication system may include the control plane network element, the first terminal device, the at least one second terminal device, and the like mentioned in the foregoing designs.

According to an eighth aspect, this application further provides a computer storage medium. The computer storage medium stores computer-executable instructions, and when the computer-executable instructions are invoked by a computer, the computer is enabled to perform any one of the foregoing methods.

According to a ninth aspect, this application further provides a computer program product including instructions, and when the computer program product runs on a computer, the computer is enabled to perform any one of the foregoing methods.

According to a tenth aspect, this application further provides a chip. The chip is coupled to a memory, and is configured to: read and execute program instructions stored in the memory, to implement any one of the foregoing methods.

BRIEF DESCRIPTION OF DRAWINGS

FIG. 7A, FIG. 7B, FIG. 7C, and FIG. 7D are a flowchart of an example of another mobility management method according to an embodiment;

DESCRIPTION OF EMBODIMENTS

The following further describes this application in detail with reference to the accompanying drawings.

Embodiments of this application provide a mobility management method and apparatus, to flexibly switch a forwarding path, and ensure service continuity in a movement process of a terminal device. The method and the apparatus in this application are based on similar concepts. The method and the apparatus have similar problem-resolving principles. Therefore, for implementation of the apparatus and the method, mutual reference may be made to each other. Details of repeated parts are not described again.

The following describes some terms in this application, to facilitate understanding of a person skilled in the art.

(1) A control plane network element (CP) is a device that performs mobility management based on movement of the terminal device. The control plane network element may be, but is not limited to, a 3rd generation partnership project (3GPP) control plane network element. For example, the control plane network element may be a session management function network element (SMF), a core network access and mobility management function network element (AMF), or a unified data management network element (UDM).

(2) At least one indicates one or more.

(3) In the descriptions of this application, terms such as "first" and "second" are merely used for distinction and description, and shall not be understood as an indication or implication of relative importance or an indication or implication of an order.

To describe technical solutions in the embodiments of this application more clearly, the following describes the mobility management method and apparatus provided in the embodiments of this application in detail with reference to the accompanying drawings.

Figure 1:
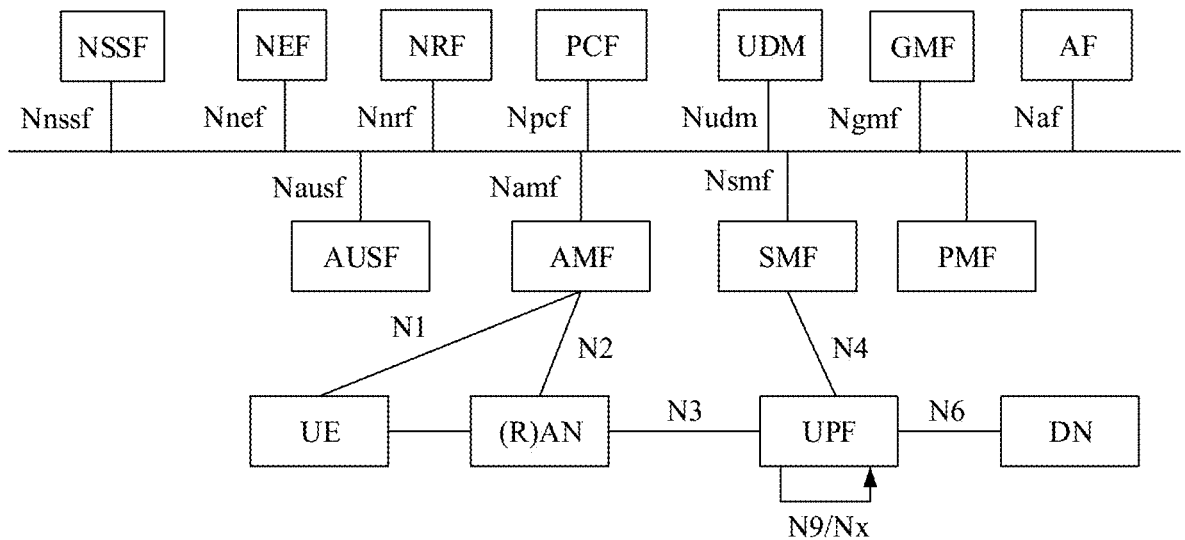
FIG. 1 is a schematic architectural diagram of a communication system according to an embodiment.

A possible communication system architecture to which a mobility management method provided in an embodiment of this application is applicable may include a network slice selection function network element, a network exposure function network element, a network function repository function network element, a policy control function network element, a data management network element, a group management function network element, an application function network element, a core network access and mobility management function network element, a session management function network element, an authentication server function network element, a path management function network element, a terminal device, an access network device, a user plane function network element, and a data network. FIG. 1 shows a possible example of the communication system architecture, and the communication system architecture specifically includes: a network slice selection function (NSSF) network element, a network exposure function (NEF) network element, a (network function, NF) repository function (NRF) network element, a policy control function (PCF) network element, a UDM network element, a group management function (GMF) network element, an application function (AF) network element, an AMF network element, an SMF network element, an authentication server function (AUSF) network element, a path management function (PMF) network element, UE, an access network (AN) device, a user plane function (UPF) network element, and a data network (DN). The AMF network element may be connected to the terminal device through an N1 interface. The AMF may be connected to the AN device through an N2 interface. The AN device may be connected to the UPF through an N3 interface. The SMF may be connected to the UPF through an N4 interface. The UPF may be connected to the DN through an N6 interface. An interface name is merely an example for description. This is not specifically limited in this embodiment of this application. It should be understood that this embodiment of this application is not limited to the communication system shown in FIG. 1. Names of the network elements shown in FIG. 1 are merely used as examples for description herein, and do not constitute limitations on the network elements included in the communication system architecture to which the method in this application is applicable. Functions of the network elements or devices in the communication system are described in detail below.

The terminal device may also be referred to as user equipment (UE), a mobile station (MS), a mobile terminal (MT), or the like, and is a device that provides voice and/or data connectivity to a user. For example, the terminal device may include a handheld device, a vehicle-mounted device, a computing device, and a MS that have a wireless connection function, or another processing device connected to a wireless modem, and a mobile terminal that communicates with one or more core networks by using an access network. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, an automated guided vehicle (AGV), an AGV controller, or the like. In FIG. 1, the terminal device shown by using UE is merely used as an example, and the terminal device is not limited.

A radio access network may be the AN shown in FIG. 1, and provide a wireless access service to the terminal device. The access network device is a device, in the communication system, that enables the terminal device to access a wireless network. The access network device is a node in the radio access network, and may also be referred to as a base station, or may also be referred to as a radio access network (RAN) node (or device). Currently, the access network device is, for example, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, HNB), a baseband unit (BBU), or a wireless fidelity (Wi-Fi) access point (AP).

The data network, for example, the DN shown in FIG. 1, may be the Internet, an IP multimedia service (IMS) network, a regional network (namely, a local network, for example, a mobile edge computing (MEC) network), or the like. The data network includes an application server, and the application server provides a service to the terminal device by performing data transmission with the terminal device.

A core network is configured to enable the terminal device to access a DN that can implement a service of the terminal device. The following describes functions of network elements in the core network.

The core network access and mobility management function network element may be configured to manage access control and mobility of the terminal device. In actual application, the core network access and mobility management function network element includes a mobility management function in a mobility management entity (MME) in a network framework in long term evolution (LTE), and includes an access management function. Specifically, the core network access and mobility management function network element may be responsible for registration of the terminal device, mobility management, a tracking area update procedure, reachability detection, selection of a session management function network element, mobility status transition management, and the like. For example, in 5G, the core network access and mobility management function network element may be an AMF network element, for example, as shown in FIG. 1. In future communication such as 6G, the core network access and mobility management function network element may still be an AMF network element or have another name. This is not limited in this application. When the core network access and mobility management function network element is an AMF network element, the AMF may provide an Namf service.

The session management function network element may be configured to be responsible for session management (including session establishment, modification, and release) of the terminal device, selection and reselection of the user plane function network element, internet protocol (IP) address allocation of the terminal device, quality of service (QoS) control, and the like. For example, in 5G, the session management function network element may be an SMF network element, for example, as shown in FIG. 1. In future communication such as 6G, the session management function network element may still be an SMF network element or have another name. This is not limited in this application. When the session management function network element is an SMF network element, the SMF may provide an Nsmf service.

The policy control function network element may be configured to be responsible for policy control decision-making, and providing functions such as service data flow-based application detection, gating control, QoS, and flow-based charging control. For example, in 5G, the policy control function network element may be a PCF network element, for example, as shown in FIG. 1. In future communication such as 6G, the policy control function network element may still be a PCF network element or have another name. This is not limited in this application. When the policy control function network element is a PCF network element, the PCF network element may provide an Npcf service.

A main function of the application function network element is to interact with a 3GPP core network to provide a service, to affect service flow routing, access network capability exposure, policy control, and the like. For example, in 5G, the application function network element may be an AF network element, for example, as shown in FIG. 1. In future communication such as 6G, the application function network element may still be an AF network element or have another name. This is not limited in this application. When the application function network element is an AF network element, the AF network element may provide an Naf service.

The data management network element may be configured to manage subscription data of the terminal device, registration information related to the terminal device, and the like. For example, in 5G, the data management network element may be a UDM, for example, as shown in FIG. 1. In future communication such as 6G, the data management network element may still be a UDM network element or have another name. This is not limited in this application. When the data management network element is a UDM network element, the UDM network element may provide an Nudm service.

The network exposure function network element may be configured to enable the 3GPP to securely provide a network service capability to an AF (for example, a services capability server (SCS) or an application server (AS)) of a third party, and the like. For example, in 5G, the network exposure function network element may be an NEF network element, for example, as shown in FIG. 1. In future communication such as 6G, the network exposure function network element may still be an NEF network element or have another name. This is not limited in this application. When the network exposure function network element is an NEF, the NEF may provide an Nnef service to another network function network element.

The user plane function network element may be configured to forward user plane data of the terminal device. Main functions include data packet routing and forwarding, mobility anchoring, supporting, by using an uplink classifier, routing of a service flow to the data network, supporting a multihoming packet data unit (PDU) session by using a branch point, and the like. For example, in 5G, the user plane function network element may be a UPF network element, for example, as shown in FIG. 1. In future communication such as 6G, the user plane function network element may still be a UPF network element or have another name. This is not limited in this application.

The authentication server function network element may be configured to provide an authentication service. For example, in 5G, the authentication server function network element may be an AUSF network element, for example, as shown in FIG. 1. In future communication such as 6G, the authentication server function network element may still be an AUSF network element or have another name. This is not limited in this application. When the authentication server function network element is an AUSF network element, the AUSF network element may provide an Nausf service.

The group management function network element may be configured to: manage a 5G LAN group, and dynamically create, modify, or delete a group based on a request of the terminal device. For example, in 5G, the group management function network element may be a GMF, for example, as shown in FIG. 1. In future communication such as 6G, the group management function network element may still be a GMF network element or have another name. This is not limited in this application.

The path management function network element has functions of managing a user plane path and implementing inter-group isolation. For example, in 5G, the path management function network element may be a PMF, for example, as shown in FIG. 1. In future communication such as 6G, the path management function network element may still be a PMF network element or have another name. This is not limited in this application.

The network slice selection function network element may be configured to select a proper network slice for a service of a terminal. For example, in 5G, the network slice selection function network element may be an NSSF, for example, as shown in FIG. 1. In future communication such as 6G, the network slice selection function network element may still be an NSSF network element or have another name. This is not limited in this application.

For example, in 5G, the network function repository function network element may be an NRF, for example, as shown in FIG. 1. In future communication such as 6G, the network function repository function network element may still be an NRF network element or have another name. This is not limited in this application.

Each of the foregoing network elements in the core network may also be referred to as a function entity, and may be a network element implemented on dedicated hardware, or may be a software instance run on dedicated hardware, or an instance of a virtualization function on a proper platform. For example, the virtualization platform may be a cloud platform.

It should be noted that the communication system architecture shown in FIG. 1 is not limited to including only the network elements shown in the figure, and may further include another device not shown in the figure. Details are not described herein in this application one by one.

It should be noted that a distribution form of the network elements in the core network is not limited in this embodiment of this application. The distribution form shown in FIG. 1 is merely an example, and is not limited in this application.

For ease of description, the network elements shown in FIG. 1 are used as examples for description subsequently in this application, and an XX network element is directly referred to as XX for short. It should be understood that names of all network elements in this application are merely used as examples, and the network elements may also be referred to as other names in future communication, or the network element mentioned in this application may also be replaced with another entity or device that has a same function in future communication. These are not limited in this application. A unified description is provided herein, and details are not described subsequently.

It should be noted that the communication system shown in FIG. 1 does not constitute a limitation on a communication system to which this embodiment of this application is applicable. The communication system architecture shown in FIG. 1 is a 5G system architecture. Optionally, the method in this embodiment of this application is further applicable to various future communication systems, for example, a 6G or another communication network.

Figure 2:
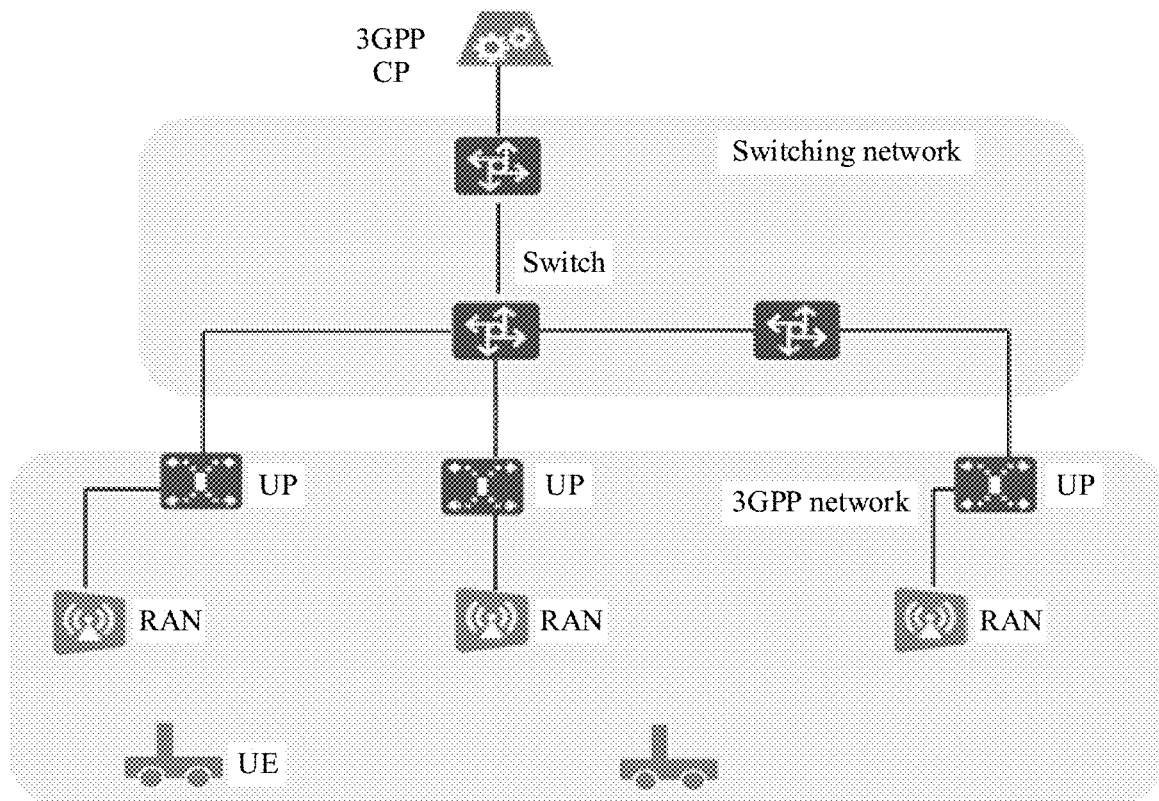
FIG. 2 is a schematic architectural diagram of another communication system according to an embodiment.
Figure 3:
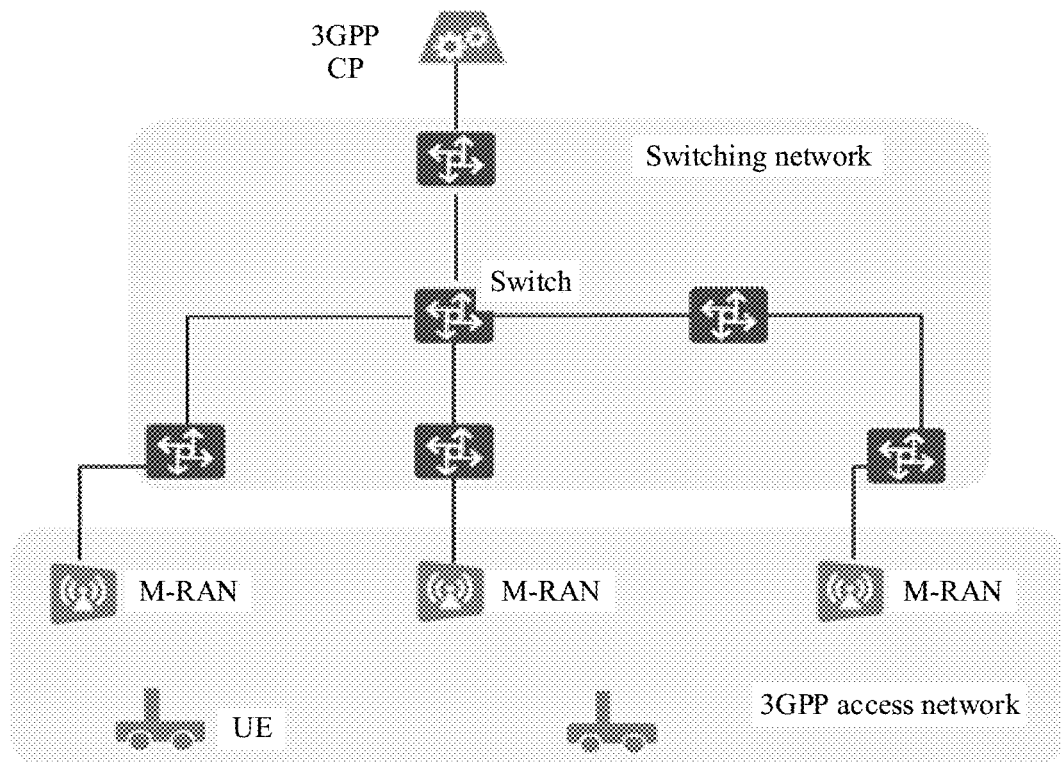
FIG. 3 is a schematic architectural diagram of another communication system according to an embodiment.

Based on the foregoing embodiment, the possible communication system architecture to which the mobility management method provided in this embodiment of this application is applicable may alternatively be that shown in FIG. 2 or FIG. 3. A UP (namely, a UPF) is deployed near an access device (RAN), and a CP is deployed at a relatively centralized location. The UPs, and the CP and the UP are connected by using a switching network. Functions of the CP and the UP in the architectures shown in FIG. 2 and FIG. 3 may be defined by using the protocol 3GPP TS 23.501. A 3GPP CP may include function entities (function network elements) such as an AMF, an SMF, and a UDM. The functions are performing authentication, access and mobility management, and the like on UE. The UP is a core network user plane function network element of 3GPP, and a main function is user plane anchoring, to provide external access. The switching network is formed by switching Ethernets, and provides reachability between 3GPP network elements and access performed by a fixed device. In an implementation, the UP is deployed near the RAN, as shown in FIG. 2.

In another implementation, the RAN and the UP may be integrated, that is, integrated into one device, and may be referred to as a merged access device (merged RAN, M-RAN) (an integrated device mentioned in this application is a merged access device). The UP is not presented separately, as shown in FIG. 3.

Figure 4:
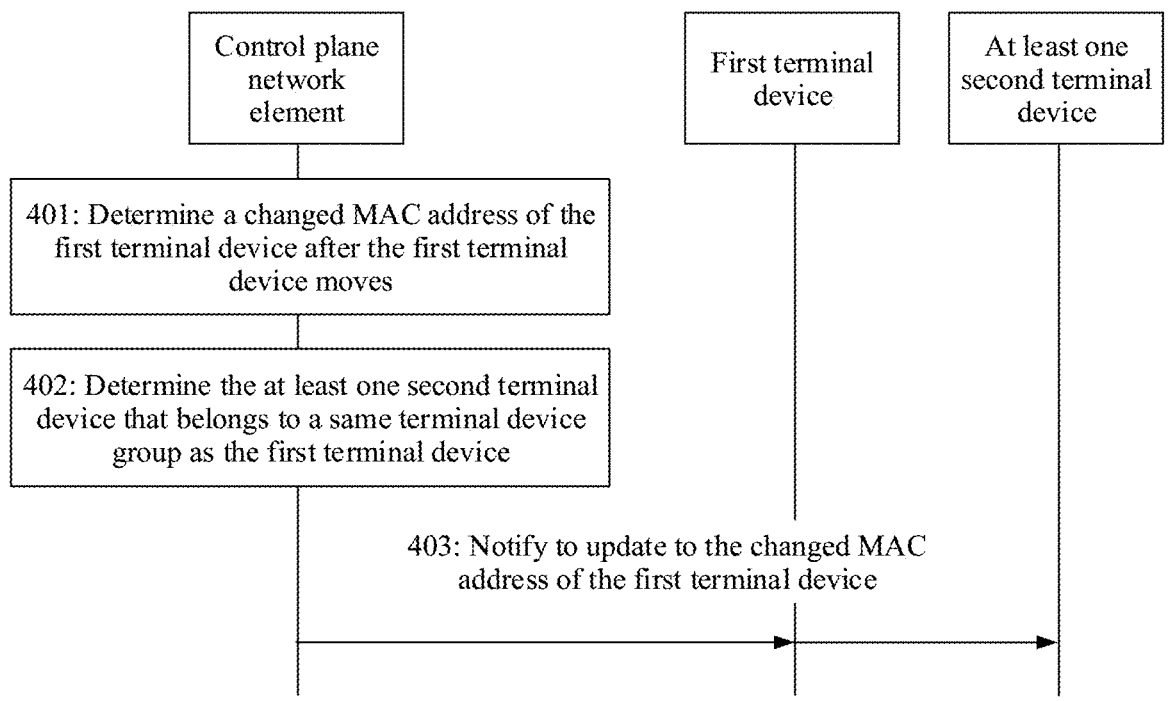
FIG. 4 is a flowchart of a mobility management method according to an embodiment.

A mobility management method provided in an embodiment of this application is applicable to the communication systems shown in FIG. 1 and FIG. 2 or FIG. 3. Referring to FIG. 4, a specific procedure of the method may include the following steps.

Step 401: A control plane network element determines a changed MAC address of a first terminal device after the first terminal device moves.

In specific implementation, the control plane network element determines to update a MAC address of the first terminal device after the first terminal device moves, determines the changed MAC address of the first terminal device, and notifies the first terminal device and another terminal device in a same terminal device group as the first terminal device to update to the changed MAC address of the first terminal device.

That the control plane network element determines the changed MAC address of the first terminal device is specifically that the control plane network element allocates a new MAC address to the first terminal device (that is, the changed MAC address of the first terminal device). In this case, the control plane network element may be an SMF.

Step 402: The control plane network element determines at least one second terminal device that belongs to the same terminal device group as the first terminal device, where the first terminal device is a terminal device whose address changes after the movement, and the at least one second terminal device is a terminal device other than the first terminal device in the terminal device group.

In an optional implementation, a specific method for determining, by the control plane network element, the at least one second terminal device that belongs to the same terminal device group as the first terminal device may include: The control plane network element queries, from a group management function network element, member information of the terminal device group to which the first terminal device belongs, where the member information includes identifiers of all terminal devices included in the terminal device group. The control plane network element determines the at least one second terminal device based on the member information.

That the control plane network element queries, from the group management function network element, the member information of the terminal device group to which the first terminal device belongs may specifically include: The control plane network element sends a member information query request to the group management function network element, where the member information query request carries an identifier of the first terminal device. The group management function network element determines, based on the identifier of the first terminal device, the terminal device group to which the first terminal device belongs, and then returns the member information to the control plane network element.

In an optional implementation, the member information may further include a PDU session identifier corresponding to each terminal device in the terminal device group.

It should be noted that, for a terminal device that performs access by using a fixed network, a related address of the terminal device may be an IP address, or a MAC address, or an IP address and a MAC address.

Step 403: The control plane network element notifies the first terminal device and the at least one second terminal device to update to the changed MAC address of the first terminal device.

In an optional implementation, that the control plane network element notifies the first terminal device to update to the changed MAC address of the first terminal device may be classified into the following two cases:

Case a1: The control plane network element sends first address update information to the first terminal device through a first device, where the first address update information includes the changed MAC address of the first terminal device, and the first device is a target access device after the first terminal device moves. In this case, an implementation method is to update the MAC address through the control plane.

Case a2: The control plane network element sends second address update information to the first terminal device through a second device, where the second address update information includes the changed MAC address of the first terminal device, and the second device is a target user plane function network element after the first terminal device moves, or the second device is a target integrated device after the first terminal device moves, where the target integrated device is a device in which an access device and a user plane function network element are integrated. In this case, an implementation method is to update the MAC address through the user plane. When a communication system to which the terminal device belongs has an independent user plane function network element (for example, the communication system shown in FIG. 2), the second device is the target user plane function network element. When a communication system to which the terminal device belongs does not have an independent user plane function network element, and the user plane function network element and the access device are integrated into one device (for example, the communication system shown in FIG. 3), the second device is the target integrated device.

In the case a1, when sending the first address update information to the first terminal device through the first device, the control plane network element may first send the first address update information to a core network access and mobility management function network element. Then, the core network access and mobility management function network element forwards the first address update information to the first device, and the first device initiates an RRC connection reestablishment request (carrying the first address update information) to the first terminal device, to request the first terminal device to update the MAC address. The first terminal device updates a MAC address cache of the first terminal device, and records the changed MAC address of the first terminal device. In an optional implementation, the first address update information may further include the identifier of the first terminal and an original MAC address of the first terminal device.

In the case a2, the control plane network element may construct a user plane packet, for example, a broadcast address resolution protocol (ARP) packet, a unicast ARP packet, or another private MAC layer message. The control plane network element carries the second address update information through the foregoing packet or message. In an example, when the second device is the target user plane function network element, the control plane network element may send the foregoing constructed packet or message through an N4 request message. Then, the target user plane function network element sends the packet or the message constructed by the control plane network element to the first terminal device. Finally, the first terminal device updates a MAC address cache of the first terminal device, and records the changed MAC address of the first terminal device. In another example, when the second device is the target integrated device, the control plane network element may first send, to the core network access and mobility management function network element, the foregoing packet or message (which for example, may be sent through an N1 message or an N2 message) constructed by the control plane network element. Then, the core network access and mobility management function network element forwards the packet or the message to the target integrated device, and the target integrated device sends the packet or the message to the first terminal device. Then, the first terminal device updates a MAC address cache of the first terminal device, and records the changed MAC address of the first terminal device. In an optional implementation, the second address update information may further include the identifier of the first terminal and an original MAC address of the first terminal device.

In an optional implementation, that the control plane network element notifies the at least one second terminal device to update to the changed MAC address of the first terminal device may be classified into the following three cases:

Case b1: When a second terminal device is a terminal device that performs access by using a 3GPP network, the control plane network element sends third address update information to the second terminal device through an access device currently accessed by the second terminal device, where the third address update information includes the changed MAC address of the first terminal device. In this case, an implementation method is to update the MAC address through the control plane.

Case b2: When a second terminal device is a terminal device that performs access by using a fixed network, the control plane network element sends fourth address update information to the second terminal device through a network exposure function network element, where the fourth address update information includes the changed MAC address of the first terminal device. In this case, an implementation method is to update the MAC address through the control plane.

Case b3: The control plane network element sends fifth address update information to the second terminal device through a third device, where the fifth address update information includes the changed MAC address of the first terminal device, and the third device is a user plane function network element currently accessed by the second terminal device, or the third device is an integrated device currently accessed by the second terminal device, where the integrated device is a device in which an access device and a user plane function network element are integrated. In this case, an implementation method is to update the MAC address through the user plane. When a communication system to which the terminal device belongs has an independent user plane function network element (for example, the communication system shown in FIG. 2), the third device is the user plane function network element currently accessed by the second terminal device. When a communication system to which the terminal device belongs does not have an independent user plane function network element, and the user plane function network element and the access device are integrated into one device (for example, the communication system shown in FIG. 3), the third device is the integrated device currently accessed by the second terminal device.

A method for sending, by the control plane network element, the third address update information to the second terminal device through the access device currently accessed by the second terminal device in the case b1 is similar to a method for sending, by the control plane network element, the first address update information to the first terminal device through the first device in the case a1. For details, refer to the foregoing process. Details are not described herein again. Similarly, the third address update information may further include the identifier of the first terminal and the original MAC address of the first terminal device.

In the case b2, when the control plane network element sends the fourth address update information to the second terminal device through the network exposure function network element, specifically, the control plane network element first sends the fourth address update information to the network exposure function network element. Then, the network exposure function network element determines an application function network element corresponding to the second terminal device, and the application function network element sends the fourth address update information to the second terminal device. Then, the application function network element and the second terminal device update a cached MAC address of the first terminal device to the changed MAC address of the first terminal device.

A method for sending, by the control plane network element, the fourth address update information to the second terminal device through the network exposure function network element in the case b3 is similar to a method for sending, by the control plane network element, the second address update information to the first terminal device through the second device in the case a2. For details, refer to the foregoing process. Details are not described herein again. It should be noted that the second terminal device may be a terminal device on a DN side.

In an optional implementation, after the control plane network element notifies all the terminal devices in the terminal device group to update to the changed MAC address of the first terminal device, the control plane network element further initiates a procedure of releasing the original MAC address of the first terminal device. The original MAC address of the first terminal device is a MAC address before the first terminal device moves. In this way, system resources are released and resource space is saved.

According to the mobility management method provided in this embodiment of this application, the control plane network element determines the changed MAC address of the first terminal device after the first terminal device moves, determines the at least one second terminal device that belongs to the same terminal device group as the first terminal device, where the first terminal device is the terminal device whose address changes after the movement, and the at least one second terminal device is the terminal device other than the first terminal device in the terminal device group. Finally, the control plane network element notifies the first terminal device and the at least one second terminal device to update to the changed MAC address of the first terminal device. In this method, the control plane network element only needs to determine the MAC address of the terminal device that moves, and notify the corresponding terminal device to update, and does not need to change a MAC address forwarding table in a system, thereby flexibly switching a forwarding path, and ensuring service continuity in a movement process of the terminal device.

Based on the foregoing embodiment, the following describes, by using a specific example, the mobility management method provided in this application. In the following examples, a device and a network element are both described by using specific examples. For example, UE is used as an example for a terminal device, a UPF is used as an example for a user plane function network element, and a RAN is used as an example for an access device.

An embodiment of this application provides an example of a mobility management method. The example is applied to the communication systems shown in FIG. 1 and FIG. 2, and mainly describes a process of allocating a MAC address of a terminal device when the terminal device is initialized. Specifically, referring to FIG. 5, a procedure of this example may be as follows:

Step 501: UE initiates an Ethernet-type PDU session establishment request.

When the UE performs step 501, specifically, the UE sends the PDU session establishment request to an AMF. In this case, the PDU session establishment request does not carry a MAC address.

In an implementation, the PDU session request may be a PDU session establishment request sent by the UE to the AMF.

Step 502: After receiving the PDU session establishment request, the AMF selects a corresponding SMF, and sends the PDU session establishment request message to the selected SMF.

Step 503: The SMF requests subscription information of a user from a UDM.

A specific process of step 503 is that the SMF sends a subscription information request to the UDM, and then the UDM returns the subscription information to the SMF.

Step 504: The SMF initiates a UE authentication procedure.

Step 505: After the authentication succeeds, the SMF finds that the UE needs to establish an Ethernet-type PDU session. The SMF selects a proper UPF and allocates a MAC address to the UE (or session).

Step 506: The SMF sends an N4 session establishment request to a UPF.

Specifically, the N4 session establishment request carries the MAC address, to indicate the UPF to select, when receiving a downlink packet, a correct N4 session to forward an Ethernet frame.

Step 507: The SMF returns a PDU session establishment accept message to the AMF, where the PDU session establishment accept message carries the MAC address allocated to the UE.

Step 508: The AMF sends the PDU session establishment request (NAS message) to a RAN, where the PDU session establishment request carries the MAC address allocated to the UE.

The PDU session establishment request may be an N2 PDU session request.

Step 509: The RAN establishes a session connection to the UPF, and initiates a radio access network-related resource reservation request to the UE, where the resource reservation request may include a PDU session establishment accept message, and carries a MAC address allocated by a CP to the UE.

The resource reservation request may be an AN-specific resource set up request sent by the RAN to the UE.

Step 510: The UE reserves an AN resource, establishes a PDU session, and stores the MAC address allocated by the SMF.

Step 511: The UE sends an access network-related resource reservation response to the RAN.

The resource reservation response may be an AN-specific resource set up response.

Step 512: The RAN and the CP complete a subsequent session establishment procedure.

Based on the foregoing embodiment, an embodiment of this application provides an example of a mobility management method. The example is applied to the communication systems shown in FIG. 1 and FIG. 3, and mainly describes a process of allocating a MAC address of a terminal device when the terminal device is initialized. Specifically, referring to FIG. 6A and FIG. 6B, a procedure of this example may be as follows:

Step 601: An M-RAN (a base station merging with some functions of a UPF) registers a capability of the M-RAN with an AMF.

An objective of step 601 is to notify the AMF that the UPF does not need to be selected, and a UPF-related session establishment operation does not need to be performed.

Step 602: UE initiates an Ethernet-type PDU session establishment request.

Specifically, the UE sends the PDU session establishment request to the AMF through the M-RAN. To be specific, the UE first sends the PDU session establishment request to the M-RAN, and then the M-RAN sends the PDU session establishment request to the AMF.

Step 603: After receiving the PDU session establishment request, the AMF finds that the PDU session establishment request is from the M-RAN, and determines that the UE currently accesses the M-RAN.

Step 604: The AMF selects an SMF, and sends the PDU session establishment request to the selected SMF.

The PDU session establishment request may carry indication information to indicate that a RAN merges with functions of the UPF, and the SMF only needs to perform functions such as QoS, authentication, and address allocation.

Step 605: The SMF initiates a UE authentication procedure.

Step 606: The SMF obtains UE and QoS policies from a UDM and a PCF.

Step 607: After the authentication succeeds, the SMF finds that the UE needs to establish an Ethernet-type PDU session, and allocates a MAC address to the UE (or session).

Step 608: The SMF initiates the PDU session establishment request to the M-RAN and the UE. Specifically, the SMF sends the PDU session establishment request to the AMF, where the PDU session establishment request carries the MAC address allocated to the UE.

The SMF may send the PDU session establishment request through an N1/N2 message transfer sent by the SMF to the AMF.

Step 609: After receiving the message of the SMF, the AMF sends the PDU session establishment request to the M-RAN through an N2 interface, where the PDU session establishment request may carry a downlink traffic classification rule and a QoS Profile, and carry the MAC address allocated to the UE.

Step 610: After receiving the MAC address of the UE, the M-RAN establishes a correspondence between the MAC address of the UE and a UE ID (for example, an RNTI), creates an SDAP instance, creates a QFI and an SRB, and establishes a mapping relationship between the QFI and the SRB. The M-RAN stores a QoS flow template on a RAN user plane, performs traffic classification on downlink data, and marks the QFI.

When the downlink data arrives, the M-RAN first finds a corresponding UE ID and SDAP based on a destination address, then marks the QFI through the traffic classification, and sends the QFI to the SDAP for processing.

Step 611: The M-RAN sends an RRC connection reconfiguration request to the UE, where the RRC connection reconfiguration request carries the PDU session establishment request sent by the SMF to the UE, and the PDU session establishment request includes the MAC address allocated to the UE.

Step 612: The UE establishes the PDU session, stores the MAC address allocated by the SMF, and completes a subsequent session establishment procedure.

Figure 5:
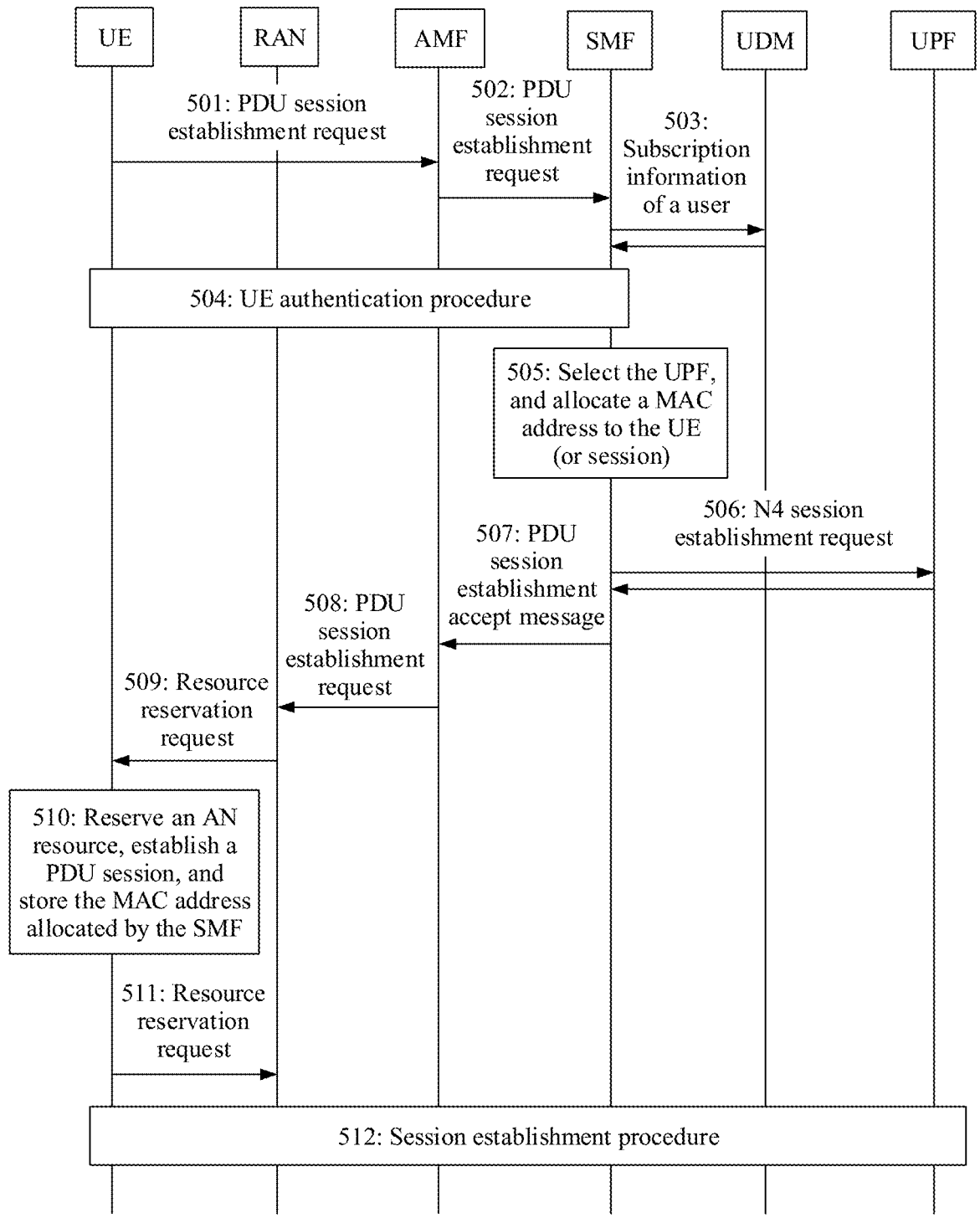
FIG. 5 is a flowchart of an example of a mobility management method according to an embodiment.
Figure 6A:
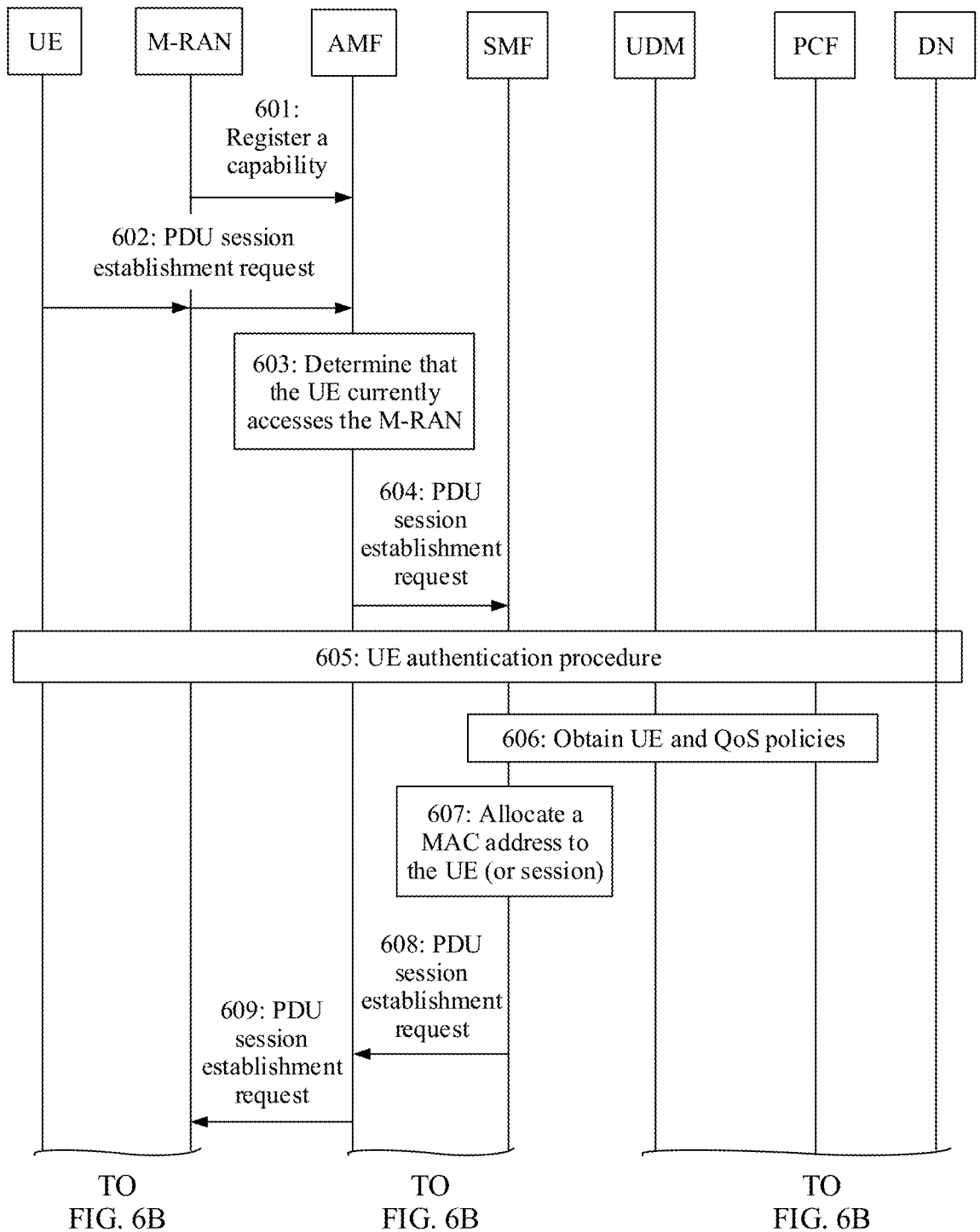
FIG. 6A and FIG. 6B are a flowchart of an example of another mobility management method according to an embodiment.
Figure 6B:
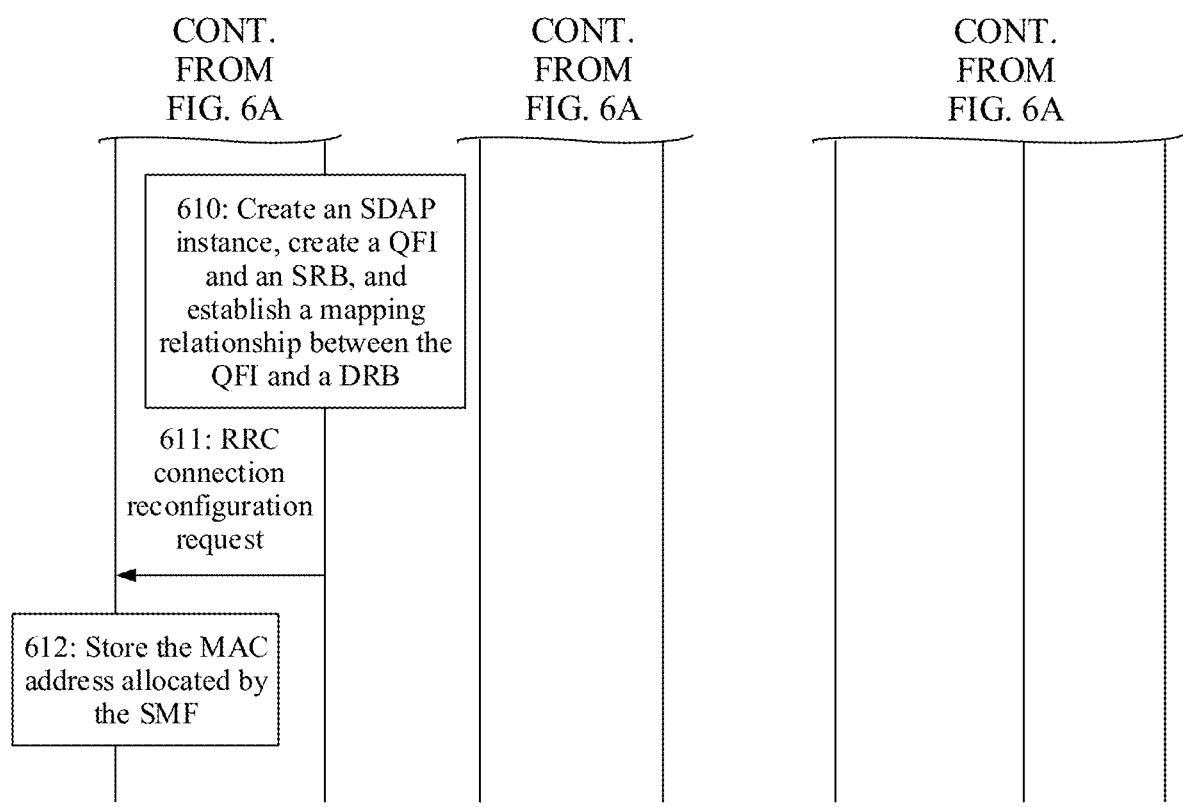
Figure 7C:
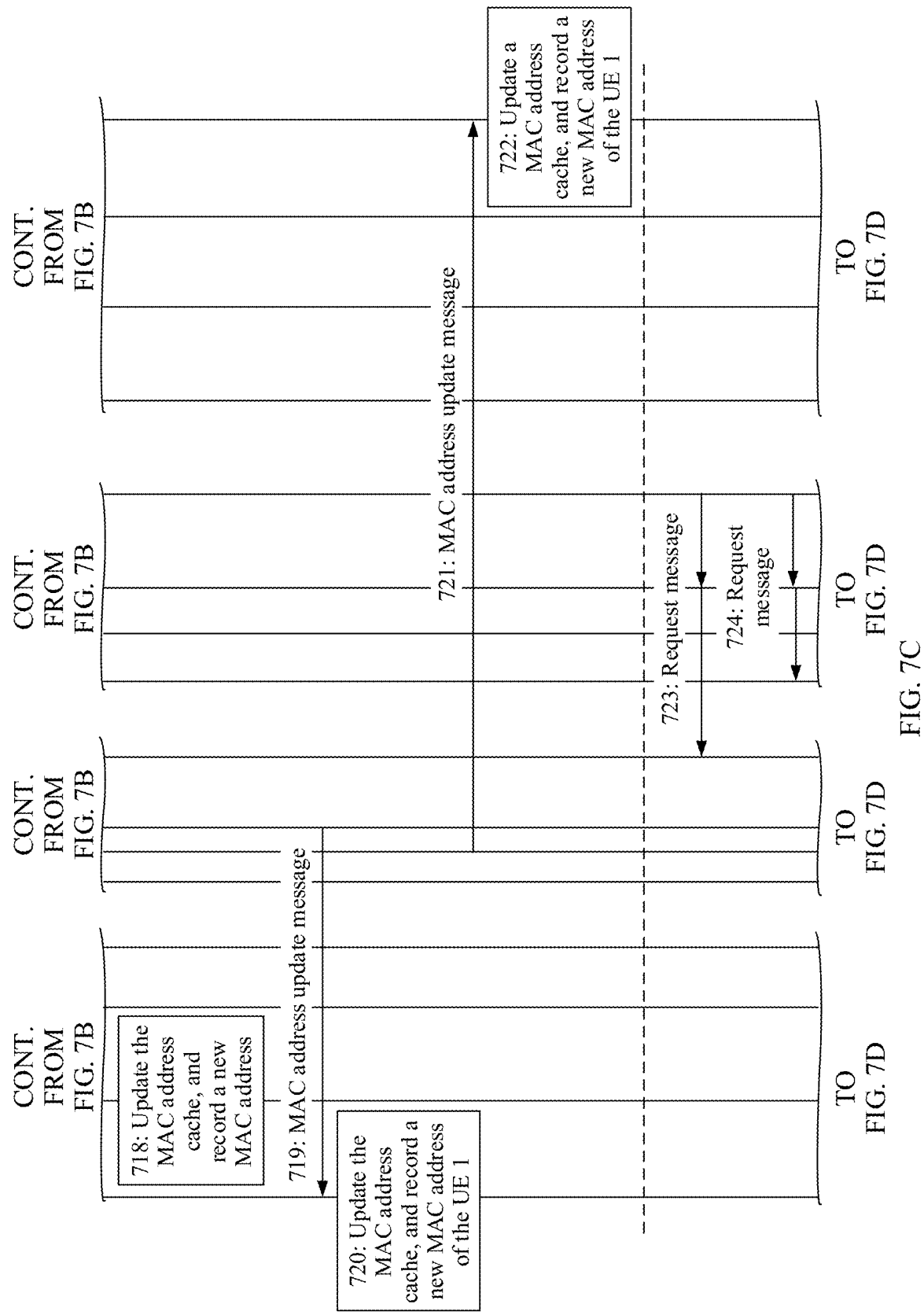
Figure 7D:
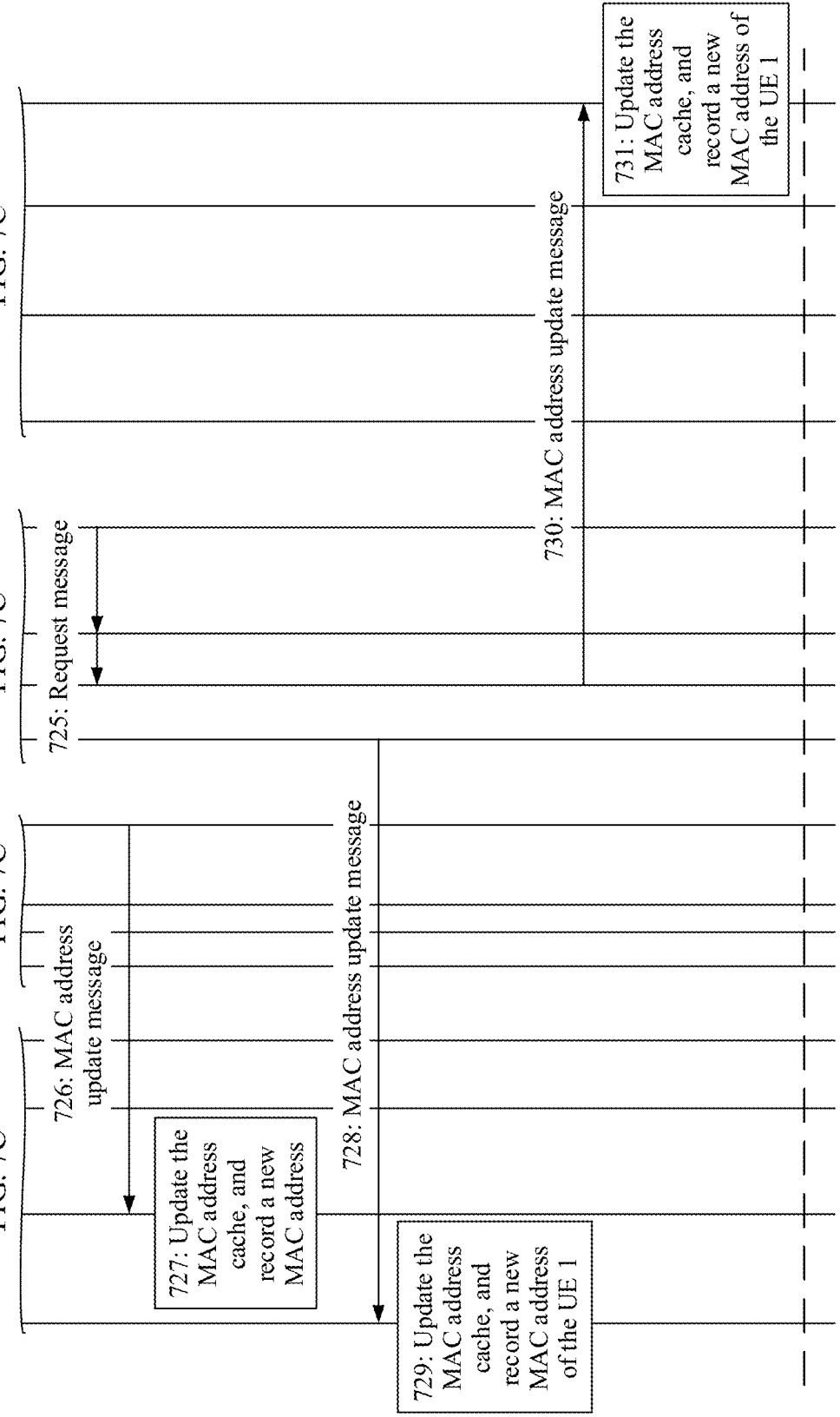

It should be noted that, for a method in which the control plane network element determines to update the MAC address of the first terminal device, and allocates a new MAC address to the first terminal device mentioned in step 401 in the embodiment shown in FIG. 4, refer to the method in which the MAC address is allocated to the UE in the example shown in FIG. 5 or FIG. 6A and FIG. 6B.

An embodiment of this application provides an example of a mobility management method. The example is applied to the communication systems shown in FIG. 1 and FIG. 2 or FIG. 3, and mainly describes that after a terminal device moves, and a MAC address changes, a control plane network element notifies the terminal device that moves, a communication peer terminal device, and another terminal device in a terminal device group to update to a changed MAC address of the terminal device that moves, to trigger MAC address update. In this example, an example in which UE 1 is UE that moves, and UE 2 is a peer terminal device communicating with the UE 1 is used for description. For example, the UE 1 may be an AGV, and the UE 2 may be an AGV controller. Specifically, referring to FIG. 7A, FIG. 7B, FIG. 7C, and FIG. 7D, a procedure of this example may be as follows:

Step 701: The UE 1 moves, and a CP (SMF) allocates a new MAC address to the UE 1.

Step 702: The SMF sends a group member information query request to a GMF, where the group member information query request is used to request other member information of a group (LAN) to which the UE 1 belongs, and the group member information query request carries a UE 1 ID.

Step 703: The GMF obtains, through query, the group (LAN) to which the UE 1 belongs, and returns a group member information query response to the SMF, where the group member information query response includes a group (LAN) member list (UE ID list), and may further include a PDU session ID corresponding to each UE in the group. It should be noted that, for a terminal device that performs access by using a fixed network, a UE ID may be an IP address or a MAC address, or an IP address and a MAC address. This is not limited in this application.

Methods for subsequently updating a MAC address cache of a group member may be specifically classified into two methods. Method 1: The MAC address is updated through a control plane. Specifically, the SMF initiates MAC address cache update to a RAN and the UE through a new signaling message. In this method, new NAS and AS messages need to be extended. For a specific method procedure, refer to the following step 704 to step 713. Method 2: The MAC address is updated through a user plane. Specifically, the SMF may update a MAC address cache through a user plane broadcast message, for example, by initiating ARP broadcast (for UE with an IP address), or extending a new message at a MAC layer. For a specific method procedure, refer to the following step 714 to step 731. It should be noted that, based on an actual situation, both the method 1 and the method 2 may be used. This is not limited in this application.

In an example, when the UE 1 and another UE perform access through a 3GPP, after obtaining the group member information, the SMF may query an SM context to find a RAN currently accessed by a corresponding UE. The SMF sends a MAC address cache update message to the RAN, where the message carries a new MAC address and an original MAC address. The message may be of a RAN granularity (where the message is sent to the RAN through an N2 interface, to notify the RAN that MAC address caches of specific UEs need to be updated), or may be of a UE granularity (where the message is directly sent to the UE through an N1 interface, and in this case, the RAN is transparent to the message). Specific steps may be steps 704 to 710.

Step 704: The SMF sends a MAC address cache update message to an AMF, where the MAC address cache update message carries a new MAC address and an original MAC address of the UE 1.

Step 705: The AMF sends the MAC address cache update message to a RAN 1.

The RAN 1 is a target RAN after the UE 1 moves. In step 705, the MAC address cache update message corresponds to the first address update information in the embodiment shown in FIG. 4.

Step 706: The AMF separately sends the MAC address cache update message to another RAN.

The another RAN is a RAN currently accessed by the another UE. Specifically, when there are a plurality of the other UEs, there are one or more other RANs. Optionally, one RAN in the other RANs may be the same as the RAN 1. For convenience, the another RAN is shown in this embodiment.

Step 707: The RAN 1 sends an RRC connection reestablishment request to the UE 1, to request the UE 1 to update a MAC address cache, where the RRC connection reestablishment request carries the ID of the UE 1, and the new MAC address and the original MAC address of the UE 1.

Step 708: The UE 1 updates a MAC address cache of the UE 1, and records the new MAC address.

Step 709: The another RAN sends the RRC connection reestablishment request to the another UE, to request the another UE to update the MAC address cache, where the RRC connection reestablishment request carries the ID of the UE 1, and the new MAC address and the original MAC address of the UE 1.

Step 710: The another UE updates a MAC address cache of the another UE, and records a new MAC address of the UE 1.

In another example, when the UE 2 performs access by using a fixed network, the SMF finds an NEF corresponding to the UE 2, and sends a MAC address cache update message to the NEF, where the MAC address cache update message carries a new MAC address and an original MAC address of the UE 1. Specific steps may be step 711 to step 713.

Step 711: The SMF sends the MAC address cache update message to the NEF, where the MAC address cache update message carries the new MAC address and the original MAC address of the UE 1.

Step 712: The NEF determines an AF corresponding to the UE 2, and forwards the MAC address cache update message to the AF.

Step 713: The AF and the UE 2 complete MAC address cache update.

In the method 2, the SMF constructs a user plane packet (that is, the MAC address cache update message), for example, a broadcast packet ARP, a unicast ARP response message, or another private MAC layer message, where the message carries an ID (for example, an IP address or a device name) of the UE 1 and a corresponding new MAC address. There may be the following examples based on a situation with a UPF or without a UPF.

In an example, in a case in which a UPF is in a network, refer to step 714 to step 722.

Step 714: The SMF sends a MAC address update message to a UPF 1, where the MAC address update message carries a constructed user plane message.

The UPF 1 is a target UPF after the UE 1 moves. The MAC address update message may be an N4 request message.

Step 715: The SMF sends the MAC address update message to another UPF.

The another UPF is a UPF currently accessed by the another UE. Specifically, when there are a plurality of the other UEs, there are one or more other UPFs. Optionally, one UPF in the other UPFs may be the same as the UPF 1. For convenience, the another UPF is shown in this embodiment.

Step 716: The SMF sends the MAC address update message to a UPF 2.

The UPF 2 is a UPF currently accessed by the UE 2.

Step 717: The UPF 1 sends the MAC address update message to the UE 1.

Step 718: The UE 1 updates the MAC address cache of the UE 1, and records the new MAC address.

Step 719: The another UPF sends the MAC address update message to the another UE.

Step 720: The another UE updates the MAC address cache of the another UE, and records a new MAC address of the UE 1.

Step 721: The UPF 2 sends the MAC address update message to the UE 2.

Step 722: The UE 2 updates a MAC address cache of the UE 2, and records a new MAC address of the UE 1.

In another example, in a case in which no UPF is in a network, and the RAN and the UPF are integrated into one device M-RAN, refer to step 723 to step 731.

Step 723: The SMF sends a request message to an M-RAN 1 through the AMF, where the request message is used to request MAC address update, and carries a constructed user plane message. The request message may be an N1 interface message or an N2 interface message.

The M-RAN 1 is an M-RAN currently accessed by the UE 1.

Step 724: The SMF sends the request message to another M-RAN through the AMF.

The another M-RAN is an M-RAN currently accessed by the another UE. Specifically, when there are a plurality of the other UEs, there are one or more other M-RANs. Optionally, one M-RAN in the other M-RANs may be the same as the M-RAN 1. For convenience, the another M-RAN is shown in this embodiment.

Step 725: The SMF sends the request message to an M-RAN 2 through the AMF.

The M-RAN 2 is an M-RAN currently accessed by the UE 2.

Step 726: The M-RAN 1 sends the MAC address update message to the UE 1.

Step 727: The UE 1 updates the MAC address cache of the UE 1, and records the new MAC address.

Step 728: The another M-RAN sends the MAC address update message to the another UE.

Step 729: The another UE updates the MAC address cache of the another UE, and records a new MAC address of the UE 1.

Step 730: The M-RAN 2 sends the MAC address update message to the UE 2.

Step 731: The UE 2 updates the MAC address cache of the UE 2, and records a new MAC address of the UE 1.

It should be noted that in the two examples in the method 2, the UE 2 may be considered as a device on a DN side.

It should be noted that the foregoing steps in the examples are not limited to the foregoing sequence, and a sequence of performing the steps is not limited in this application.

Figure 8:
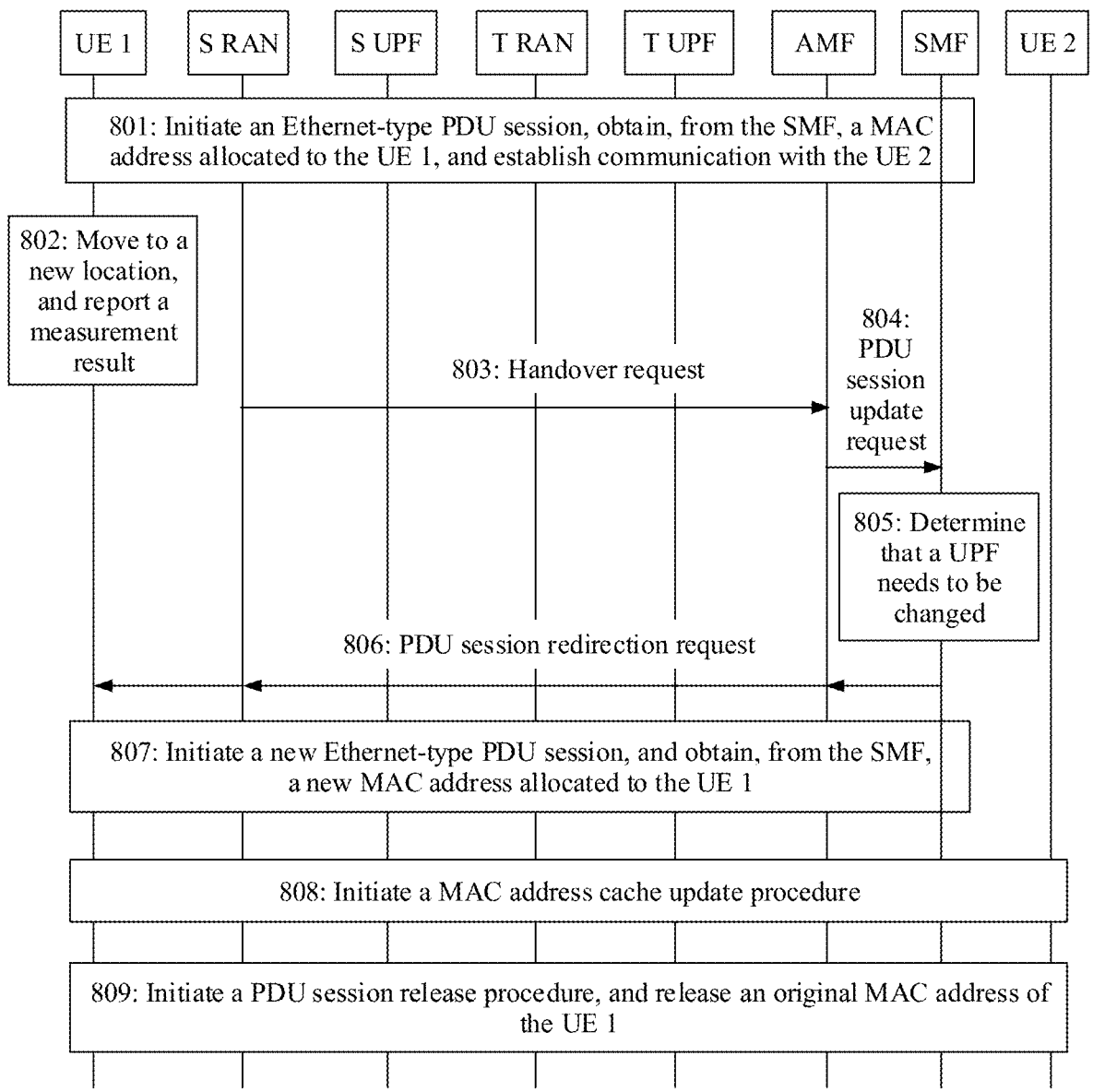
FIG. 8 is a flowchart of an example of another mobility management method according to an embodiment.

Based on the foregoing embodiment, an embodiment of this application provides an example of a mobility management method. The example may be applied to the communication systems shown in FIG. 1 and FIG. 2. In this example, a possible MAC address reallocation method in a mobility handover (UPF change) process is described, and the example is specific to a case in which a new session needs to be established (similar to a service continuity mode 3 (SSC Mode3) in the 3GPP Release 15). A specific scenario of this example is that a MAC address of UE is reallocated by an SMF, and both UE 1 (for example, an AGV) and UE 2 (for example, an AGV controller) perform access by using a 3GPP network. Specifically, referring to FIG. 8, a procedure of this example may be as follows:

Step 801: The UE 1 initiates an Ethernet-type PDU session. By using the method in the example shown in FIG. 5, the UE 1 obtains, from the SMF, a MAC address allocated to the UE 1, and the UE 1 establishes communication with the UE 2.

Step 802: The UE 1 moves to a new location, and reports a measurement result.

Step 803: An S RAN determines that a handover threshold is reached, and initiates a handover request to an AMF.

The handover request may be a handover request sent by the S RAN to the AMF.

Step 804: The AMF initiates a PDU session update request to the SMF, where the PDU session update request carries location information of the UE 1.

Step 805: The SMF determines that a UPF needs to be changed.

Step 806: The SMF sends a PDU session redirection request to the UE 1, to request the UE 1 to initiate a new PDU session, and rejects, in the PDU session redirection request, the handover request initiated by the S RAN.

Specifically, when the SMF performs step 806, the SMF sends the PDU session redirection request to the AMF. The AMF forwards the PDU session redirection request to the S RAN, and then the S RAN forwards the PDU session redirection request to the UE 1.

Step 807: The UE 1 initiates a new Ethernet-type PDU session. By using the method in the example shown in FIG. 5, the UE 1 obtains, from the SMF, anew MAC address allocated to the UE 1.

Step 808: The SMF initiates a MAC address cache update procedure. For an implementation method, refer to the process in the example shown in FIG. 7A, FIG. 7B, FIG. 7C, and FIG. 7D.

Specifically, in this example, the step of notifying the UE 1 to update the MAC address mentioned in the embodiment shown in FIG. 7A, FIG. 7B, FIG. 7C, and FIG. 7D may be or may not be performed in step 808. This is not limited in this application.

Step 809: After receiving MAC address update result messages sent by all RANs, the SMF initiates a PDU session release procedure to release an original MAC address of the UE 1.

Figure 9A:
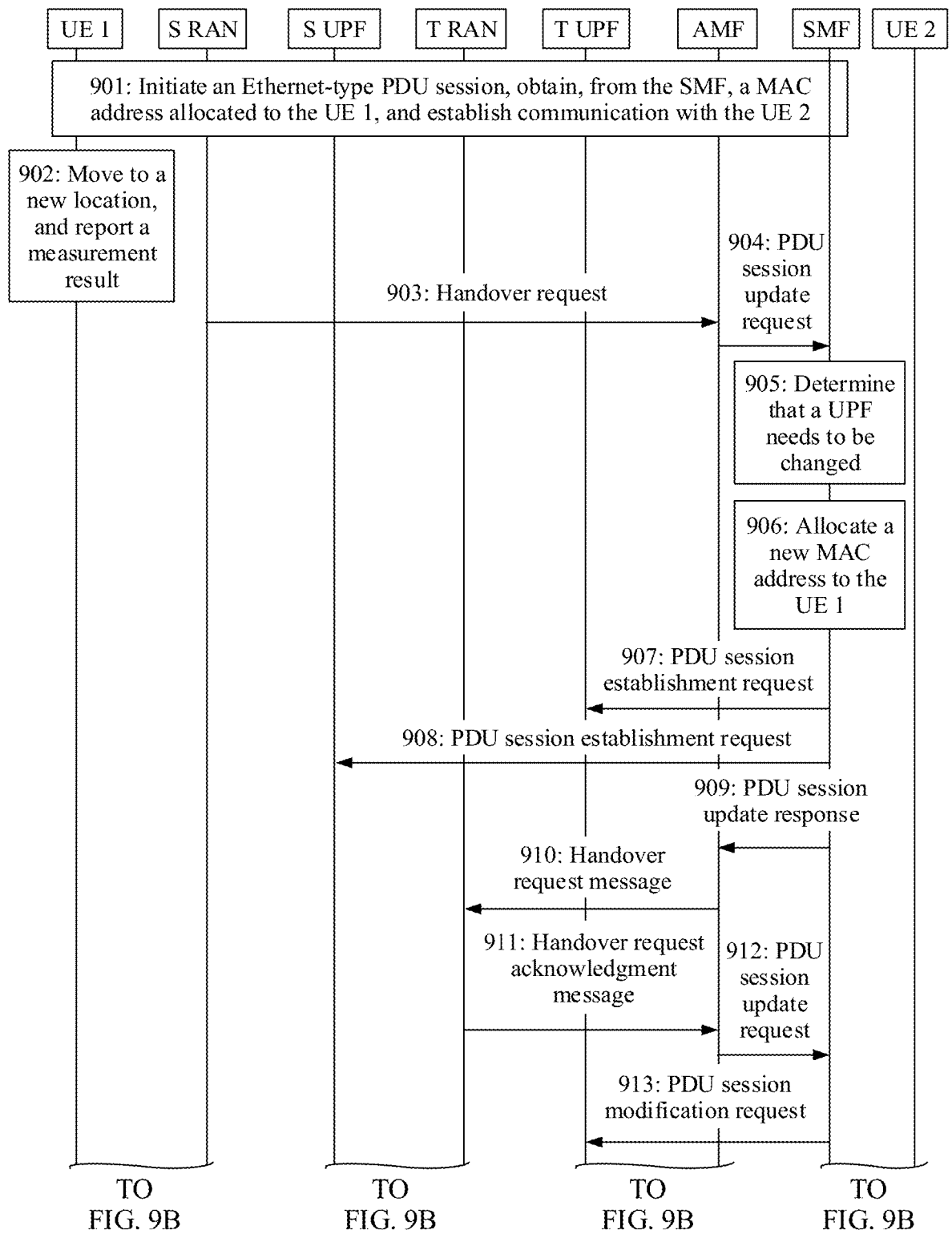
FIG. 9A and FIG. 9B are a flowchart of an example of another mobility management method according to an embodiment.
Figure 9B:
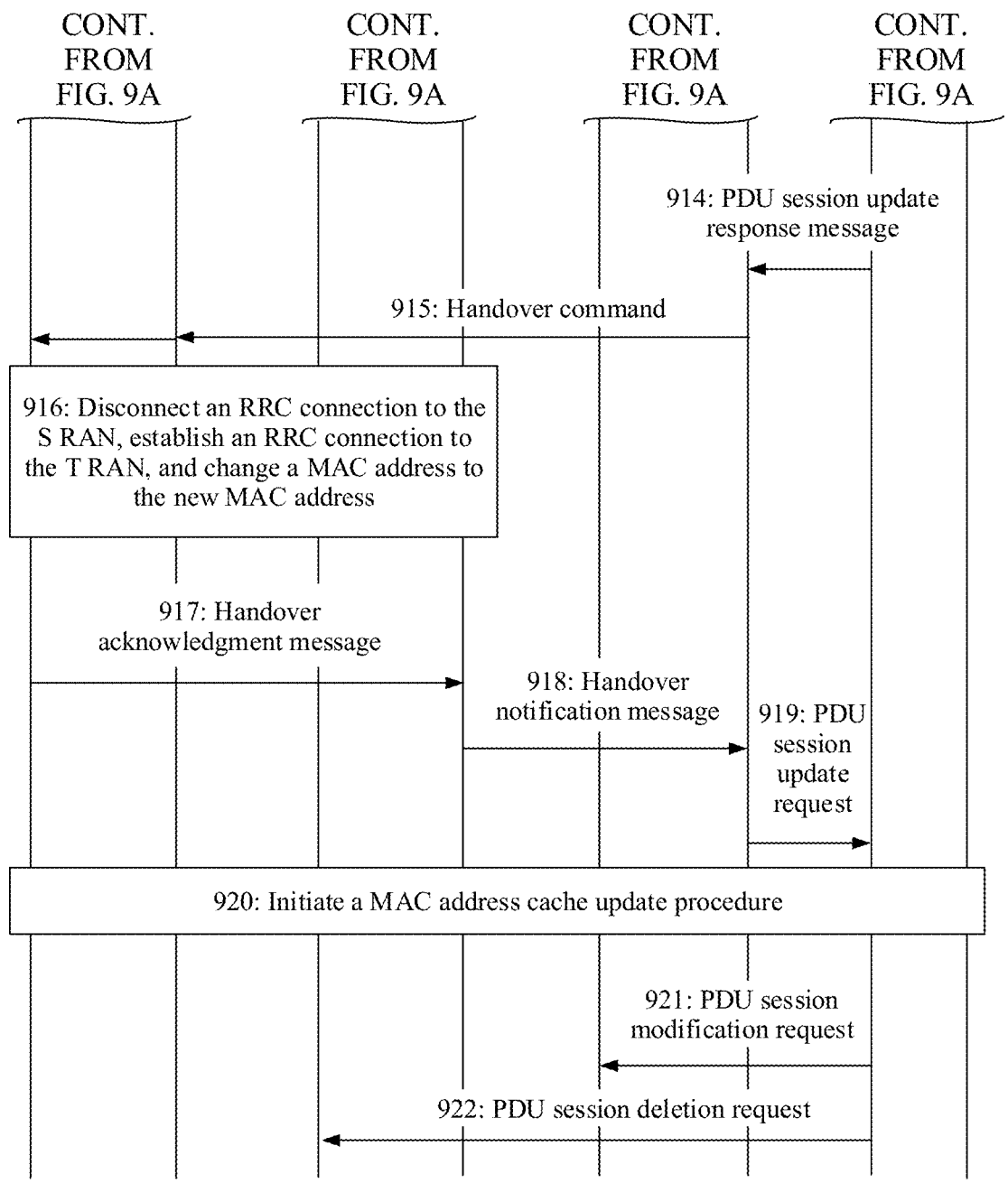

Based on the foregoing embodiment, an embodiment of this application provides an example of a mobility management method. The example may be applied to the communication systems shown in FIG. 1 and FIG. 2. In this example, another possible MAC address reallocation method in a mobility handover (UPF change) process is described. Specifically, referring to FIG. 9A and FIG. 9B, a procedure of this example may be as follows:

Step 901: UE 1 initiates an Ethernet-type PDU session. By using the method in the example shown in FIG. 5, the UE 1 obtains, from an SMF, a MAC address allocated to the UE 1. The UE 1 establishes communication with UE 2.

Step 902: The UE 1 moves to a new location, and reports a measurement result.

Step 903: An S RAN determines that a handover threshold is reached, and initiates a handover request to an AMF.

Step 904: The AMF initiates a PDU session update request to the SMF, where the PDU session update request carries location information of the UE 1.

Step 905: The SMF determines that a UPF needs to be changed.

Step 906: The SMF allocates a new MAC address to the UE 1 based on a new UPF (T UPF).

Step 907: The SMF initiates a PDU session establishment request to the T UPF, establishes a forwarding tunnel from an S UPF to the T UPF, and establishes a tunnel from the T UPF to a T RAN. The PDU session establishment request carries the newly allocated MAC address. The T UPF establishes a mapping relationship of a MAC address (to the T RAN) downlink tunnel after receiving the PDU session establishment request.

Step 908: The SMF initiates a PDU session establishment request to the S UPF, establishes a new forwarding tunnel to the UPF, sets an indirect forwarding rule, and forwards a downlink service sent to the UE 1 to the T UPF.

Step 909: The SMF sends a PDU session update response message to the AMF.

Step 910: The AMF sends a handover request message to the T RAN, where the handover request message carries tunnel information of the T UPF.

Step 911: The T RAN determines to accept the handover request, establishes a bidirectional tunnel to the T UPF, and returns a handover request acknowledgment message to the AMF, where the handover request acknowledgment message carries tunnel information of the T RAN.

Step 912: The AMF sends the PDU session update request to the SMF again, where the PDU session update request carries the tunnel information of the T RAN.

Step 913: The SMF sends a PDU session modification request to the T UPF, where the PDU session modification request carries the tunnel information of the T RAN. The SMF establishes a bidirectional forwarding tunnel to the T RAN.

Step 914: The SMF sends the PDU session update response message to the AMF, to notify the AMF that a T UPF side is ready.

Step 915: The AMF sends a handover command to the UE 1 through the S RAN, where the handover command carries a new MAC address allocated to the UE 1.

Step 916: After receiving the handover command, the UE 1 disconnects an RRC connection to the S RAN, establishes an RRC connection to the T RAN, and changes a MAC address to the new MAC address. At the same time, the UE 1 still receives a packet sent to an original MAC address.

Step 917: The UE 1 sends a handover acknowledgment message to the T RAN.

Step 918: The T RAN sends a handover notification message to the AMF.

Step 919: The AMF sends the PDU session update request to the SMF.

Step 920: The SMF initiates a new MAC address cache update procedure of the UE 1. For details, refer to the process in the example shown in FIG. 7A, FIG. 7B, FIG. 7C, and FIG. 7D.

Step 921: The SMF sends a PDU session modification request to the T UPF, where the PDU session modification request carries the original MAC address. After receiving the PDU session modification request, the T UPF deletes a connection to the S UPF, and deletes a forwarding rule related to the original MAC address.

Step 922: The SMF sends a PDU session deletion request to the S UPF, to delete a session resource related to the UE 1.

Based on the foregoing embodiment, an embodiment of this application provides an example of a mobility management method. The example may be applied to the communication systems shown in FIG. 1 and FIG. 3. In this example, a MAC address update procedure in a mobility handover process is described. Specifically, referring to FIG. 10, a procedure of this example may be as follows:

Step 1001: UE 1 is handed over from an S M-RAN to a T M-RAN.

Step 1002: The T M-RAN sends a path switch request message to an AMF.

Step 1003: When determining that a RAN merges with a UPF (namely, an M-RAN), the AMF forwards the path switch request message to an SMF, and includes merged RAN (without a UPF) indication information in the forwarded path switch request message.

Step 1004: The SMF determines, based on a current network architecture, that the UE 1 changes an address segment (in other words, a MAC address is changed), and reallocates a new MAC address to the UE 1 based on a current location.

Step 1005: The SMF sends a MAC address reallocation request to the T M-RAN through the AMF, where the MAC address reallocation request carries a UE 1 ID and the new MAC address.

Step 1006: The T M-RAN sends an RRC connection reconfiguration message to the UE 1, to store the new MAC address.

Step 1007: The UE 1 stores the new MAC address, uses the new MAC address in a subsequent uplink packet, but receives packets of an original MAC address and the new MAC address simultaneously on a downlink.

Step 1008: The SMF initiates a MAC address cache update procedure of the UE 1. For an implementation method, refer to the process in the example shown in FIG. 7A, FIG. 7B, FIG. 7C, and FIG. 7D. Details are not described herein again.

Step 1009: The SMF returns a path switch completion message to the AMF.

Step 1010: The AMF sends the path switch completion message to the T M-RAN.

Step 1011: The T M-RAN sends a context release message of the UE 1 to the S M-RAN, to indicate that the switching is completed.

Step 1012: After forwarding a data packet, the S M-RAN sends an end marker indication to the T M-RAN.

Step 1013: The T M-RAN sends the RRC connection reconfiguration message to the UE 1, and deletes the original MAC address of the UE 1.

Figure 10:
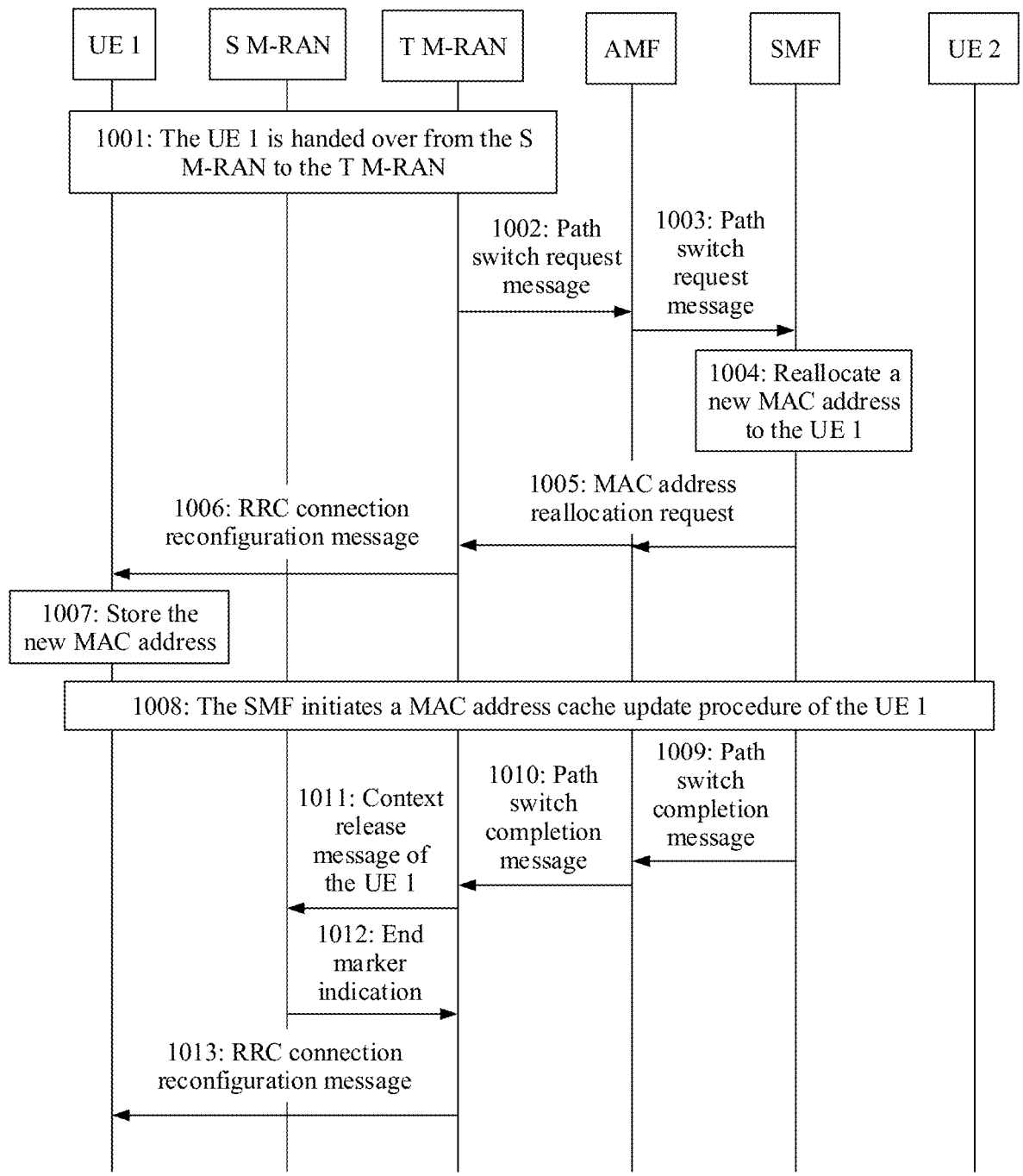
FIG. 10 is a flowchart of an example of another mobility management method according to an embodiment.
Figure 11:
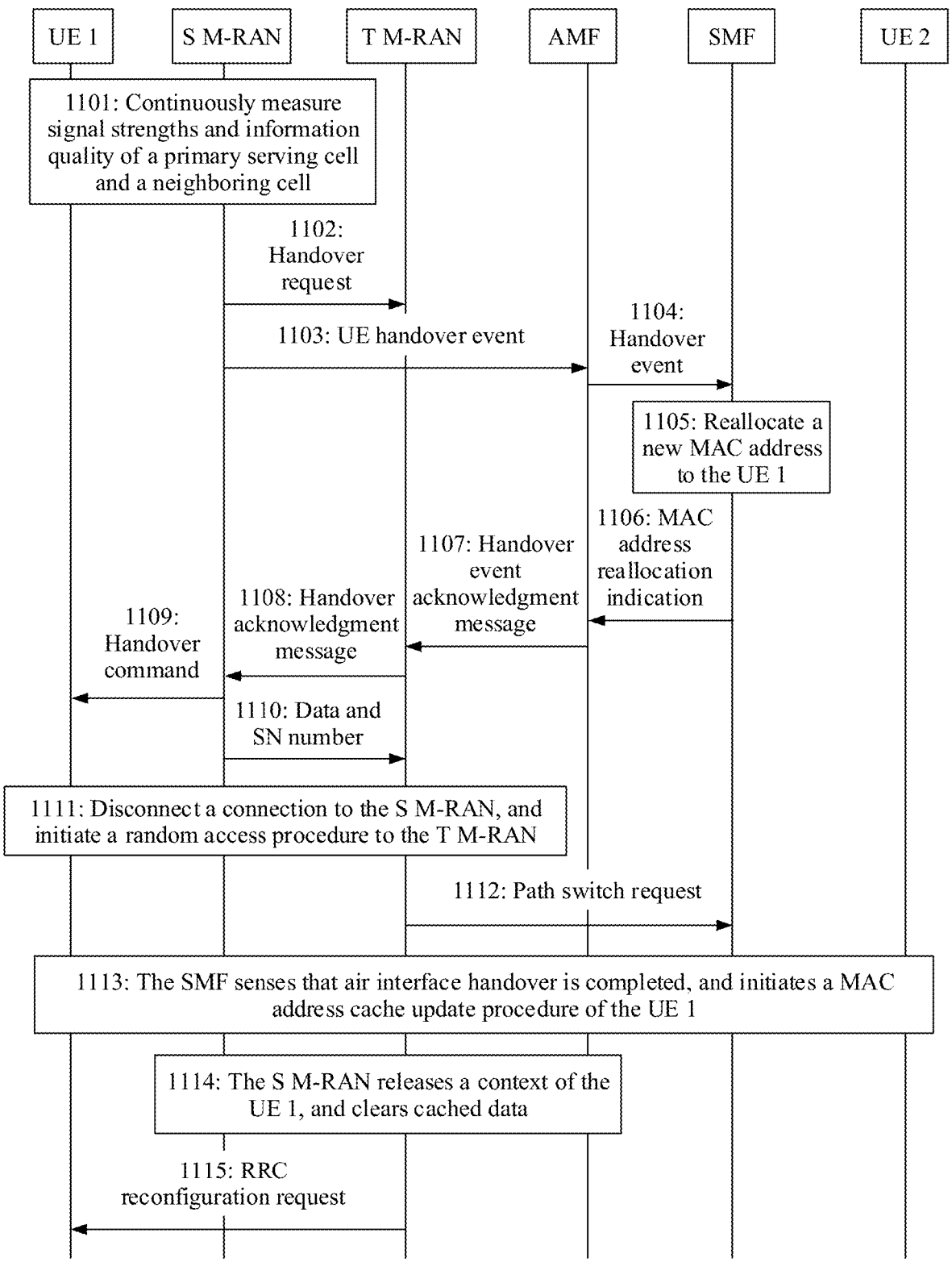
FIG. 11 is a flowchart of an example of another mobility management method according to an embodiment.

Based on the example shown in FIG. 10, further, to accelerate a MAC address allocation process, a handover event may further be notified to an AMF in a handover preparation phase, for example, step 1103 to step 1107 shown in FIG. 11. A path switch is initiated immediately after new RRC connection is established, for example, step 1112 and step 1113 shown in FIG. 11. Referring to FIG. 11, a specific procedure may be as follows:

Step 1101: UE 1 continuously measures signal strengths and information quality of a primary serving cell and a neighboring cell.

Step 1102: An S M-RAN detects that quality of the neighboring cell is better than that of a current cell, and sends a handover request to the neighboring cell (T M-RAN).

Step 1103: The neighboring cell (T M-RAN) determines to accept the handover request, and sends a UE handover event to an AMF, where the UE handover event carries a UE 1 ID, an S M-RAN ID, and a T M-RAN ID.

Step 1104: The AMF sends the handover event to an SMF, where the handover event carries the UE 1 ID, the S M-RAN ID, and the T M-RAN ID.

Step 1105: The SMF determines, based on a current network architecture, that the UE 1 changes an address segment (in other words, a MAC address is changed), and therefore reallocates a new MAC address to the UE 1 based on a current location.

Step 1106: The SMF sends a MAC address reallocation indication to the AMF, where the MAC address reallocation indication carries the new MAC address of the UE 1.

Step 1107: The AMF sends a handover event acknowledgment message to the T M-RAN, where the handover event acknowledgment message carries the MAC address reallocation indication, the UE 1 ID, the S M-RAN ID, a source MAC address, and the new MAC address.

Step 1108: The T M-RAN sends a handover acknowledgment message to the S M-RAN, where the handover acknowledgment message carries a new MAC address allocated by a CP to the UE 1.

Step 1109: The S M-RAN sends a handover command to the UE 1, where the handover command carries the new MAC address allocated by the CP to the UE 1.

Step 1110: The S M-RAN forwards data and an SN number to the T M-RAN.

Step 1111: The UE 1 disconnects a connection to the S M-RAN, and initiates a random access procedure to the T M-RAN. The UE 1 stores the new MAC address, uses the new MAC address in a subsequent uplink packet, but receives packets of an original MAC address and the new MAC address simultaneously on a downlink.

Step 1112: The T M-RAN sends a path switch request to the SMF.

Step 1113: The SMF senses that air interface handover is completed, and therefore initiates a MAC address cache update procedure of the UE 1. For an implementation method, refer to the process in the example shown in FIG. 7A, FIG. 7B, FIG. 7C, and FIG. 7D. Details are not described herein again.

Step 1114: After the path switch is completed, the S M-RAN releases a context of the UE 1, and clears cached data. For detailed steps, refer to step 1009 to step 1012 in the example shown in FIG. 10.

Step 1115: The T M-RAN sends an RRC reconfiguration request to the UE 1, and deletes the original MAC address of the UE 1. The UE 1 no longer receives a packet sent to the original MAC address.

Figure 12A:
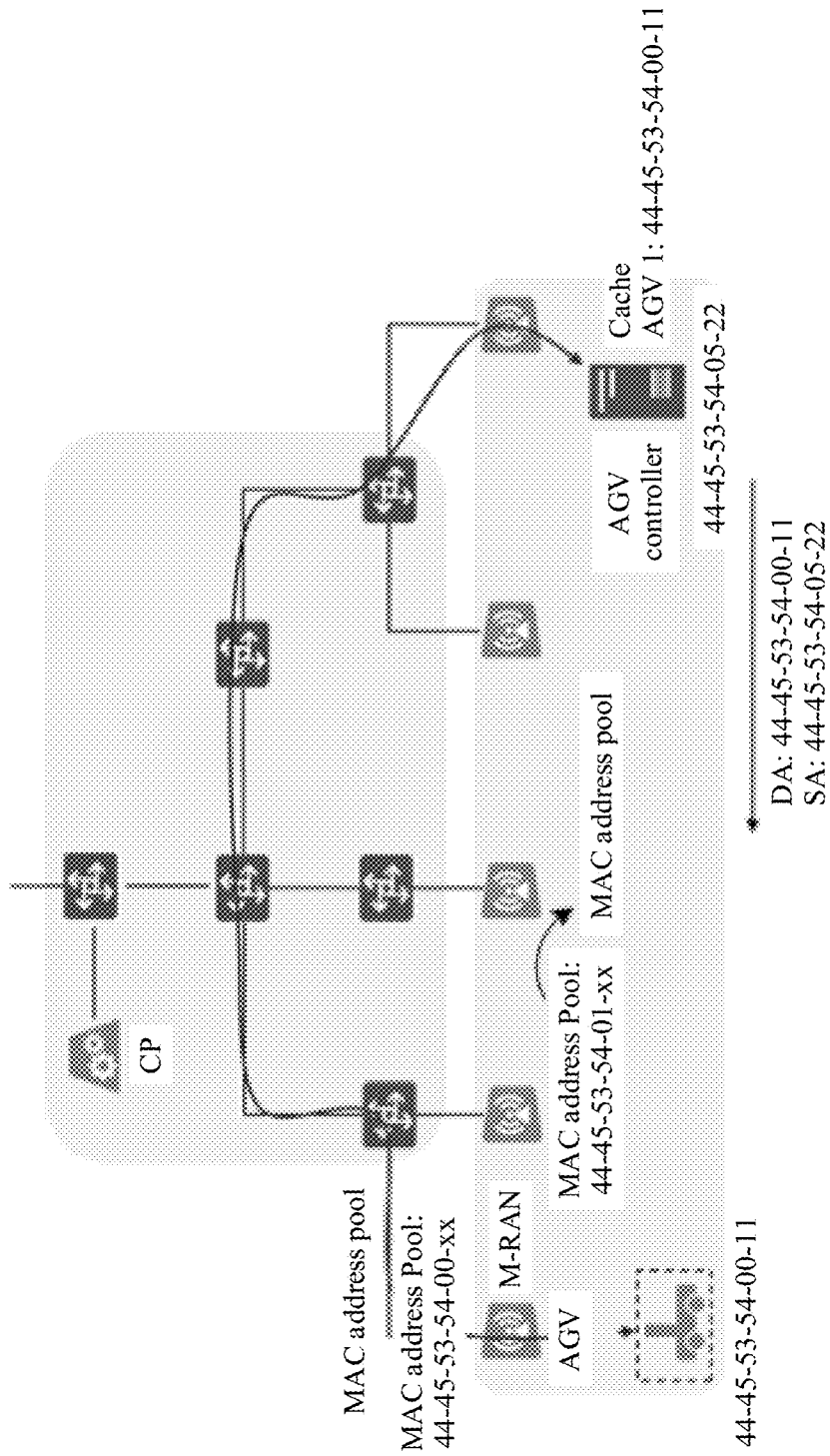
FIG. 12*a* is a schematic diagram of a service path according to an embodiment.
Figure 12B:
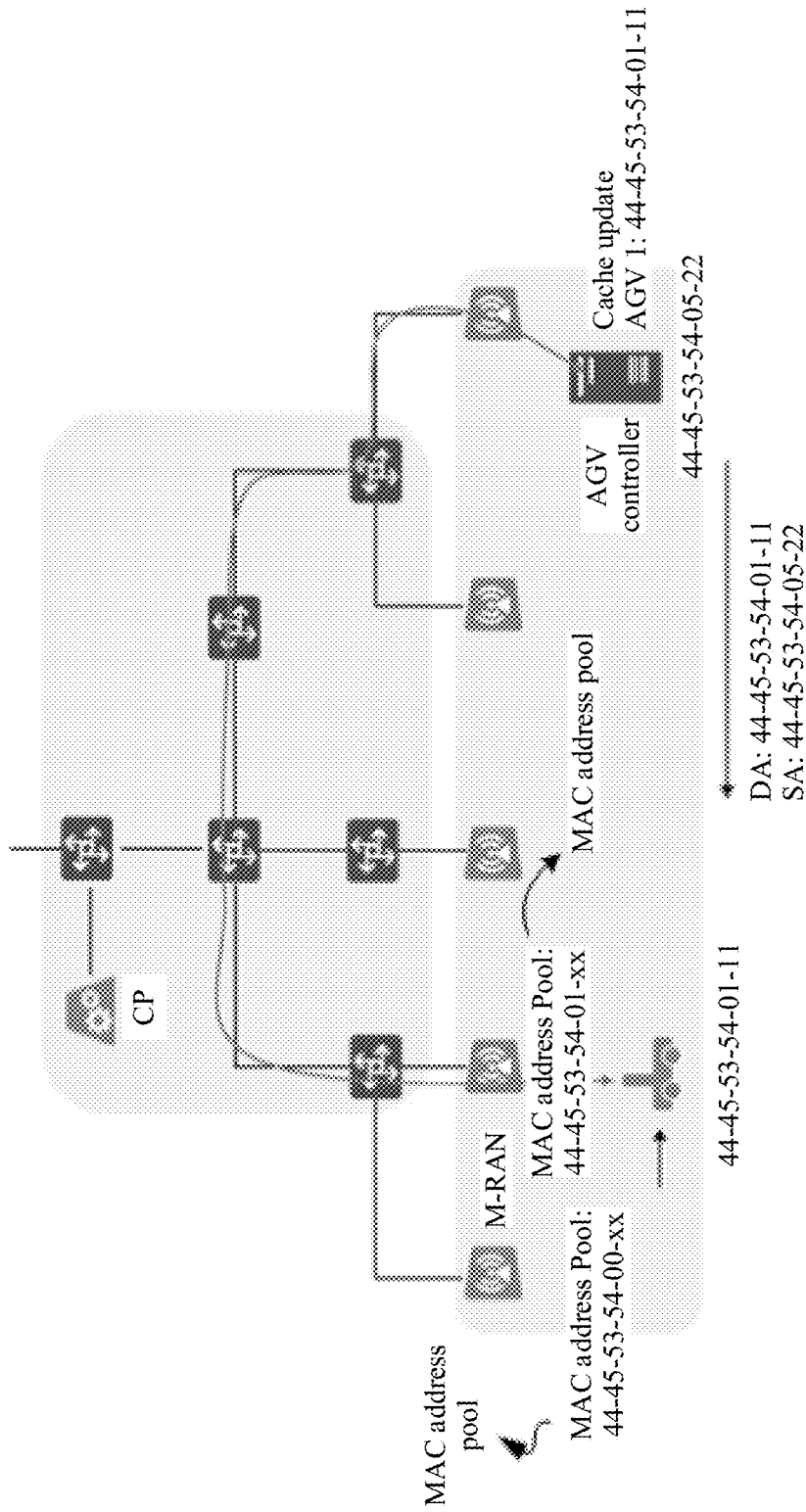
FIG. 12*b* is a schematic diagram of another service path according to an embodiment.

Based on the foregoing embodiment, a specific example is used to describe a path switch process that uses a mobility management method provided in this embodiment of this application. For example, in a scenario in which a UP and a RAN are integrated as an M-RAN, before switching, UE (AGV) uses an address 44-45-53-54-00-11 of a source base station, and records a current MAC address of the UE (AGV) as 44-45-53-54-00-11 in a cache (for example, ARP cache) of an AGV controller. The AGV controller uses this address as a destination MAC address of an Ethernet frame sent to the AGV. For example, a service path before the switching may be that shown in FIG. 12*a*. After the switching is completed, the UE uses an address 44-45-53-54-01-11 allocated by a target base station. A 3GPP network notifies the AGV controller to update an address cache through a NAS signaling message, and updates a MAC address of the AGV in the cache to 44-45-53-54-01-11. This address is used as a destination MAC address for a subsequent message sent to the AGV. For example, a service path before the switching may be that shown in FIG. 12*b*. It can be learned from this example that, after a terminal device moves, only a MAC address of the terminal device needs to be changed, but a MAC forwarding table in a switching network does not need to be updated, thereby flexibly switching a path, and ensuring service continuity.

Figure 13:
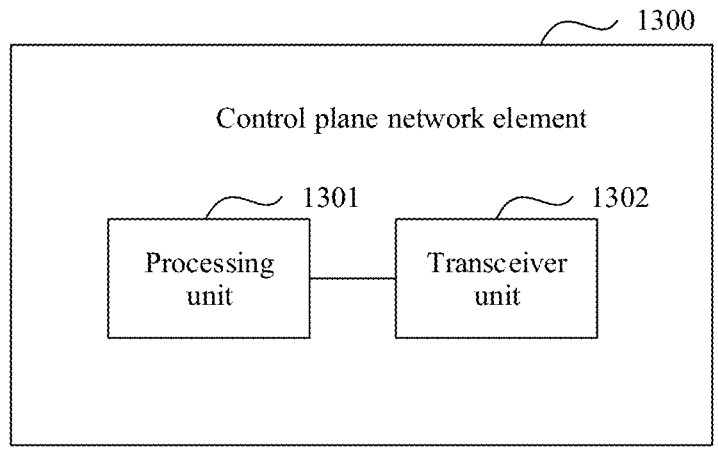
FIG. 13 is a schematic structural diagram of a control plane network element according to an embodiment.

Based on the foregoing embodiments, an embodiment of this application further provides a control plane network element. The control plane network element is configured to implement the mobility management methods shown in FIG. 4 to FIG. 11. Referring to FIG. 13, the control plane network element 1300 may include a processing unit 1301 and a transceiver unit 1302.

The processing unit 1301 is configured to: determine a changed media access control address MAC address of a first terminal device after the first terminal device moves, and determine at least one second terminal device that belongs to a same terminal device group as the first terminal device, where the first terminal device is a terminal device whose address changes after the movement, and the at least one second terminal device is a terminal device other than the first terminal device in the terminal device group.

The transceiver unit 1302 is configured to notify the first terminal device and the at least one second terminal device to update to the changed MAC address of the first terminal device.

In an optional implementation, when determining the at least one second terminal device that belongs to the same terminal device group as the first terminal device, the processing unit 1301 is specifically configured to: query, from a group management function network element, member information of the terminal device group to which the first terminal device belongs, where the member information includes identifiers of all terminal devices included in the terminal device group, and determine the at least one second terminal device based on the member information.

In an optional implementation, when notifying the first terminal device to update to the changed MAC address of the first terminal device, the transceiver unit 1302 is specifically configured to: send first address update information to the first terminal device through a first device, where the first address update information includes the changed MAC address of the first terminal device, and the first device is a target access device after the first terminal device moves; or send second address update information to the first terminal device through a second device, where the second address update information includes the changed MAC address of the first terminal device, and the second device is a target user plane function network element after the first terminal device moves, or the second device is a target integrated device after the first terminal device moves, where the target integrated device is a device in which an access device and a user plane function network element are integrated.

In an optional implementation, when a second terminal device is a terminal device that performs access by using a 3GPP network, the transceiver unit 1302 is specifically configured to: when notifying the at least one second terminal device to update to the changed MAC address of the first terminal device, send third address update information to the second terminal device through an access device currently accessed by the second terminal device, where the third address update information includes the changed MAC address of the first terminal device.

In an optional implementation, when a second terminal device is a terminal device that performs access by using a fixed network, the transceiver unit 1302 is specifically configured to: when notifying the at least one second terminal device to update to the changed MAC address of the first terminal device, send fourth address update information to the second terminal device through a network exposure function network element, where the fourth address update information includes the changed MAC address of the first terminal device.

In an optional implementation, when notifying at least one second terminal device to update to the changed MAC address of the first terminal device, the transceiver unit 1302 is specifically configured to: send fifth address update information to the second terminal device through a third device, where the fifth address update information includes the changed MAC address of the first terminal device, and the third device is a user plane function network element currently accessed by the second terminal device, or the third device is an integrated device currently accessed by the second terminal device, where the integrated device is a device in which an access device and a user plane function network element are integrated.

In an optional implementation, the processing unit 1301 is further configured to: initiate a procedure of releasing an original MAC address of the first terminal device, where the original MAC address of the first terminal device is a MAC address before the first terminal device moves.

Figure 14:
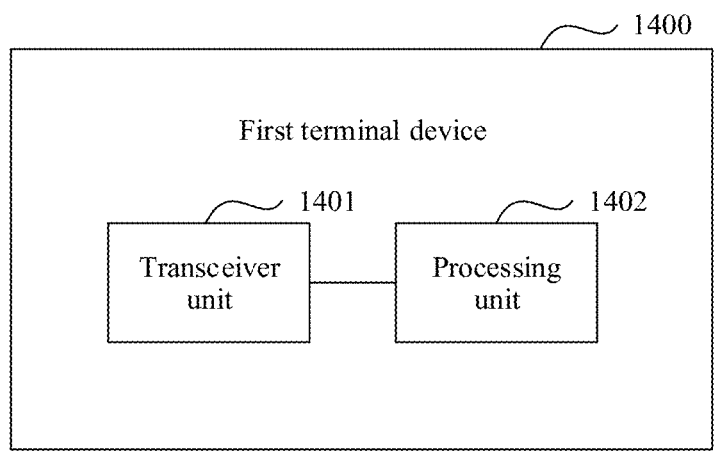
FIG. 14 is a schematic structural diagram of a first terminal device according to an embodiment.

Based on the foregoing embodiments, an embodiment of this application further provides a first terminal device. The first terminal device is configured to implement the mobility management methods shown in FIG. 4 to FIG. 11. Referring to FIG. 14, the first terminal device 1400 may include a transceiver unit 1401 and a processing unit 1402.

The transceiver unit 1401 is configured to obtain, from a control plane network element, a notification of updating to a changed MAC address of the first terminal device. The processing unit 1402 is configured to update a MAC address to the changed MAC address of the first terminal device.

In an optional implementation, when obtaining, from the control plane network element, the notification of updating to the changed MAC address of the first terminal device, the transceiver unit 1401 is specifically configured to: receive first address update information sent by the control plane network element through a first device, where the first address update information includes the changed MAC address of the first terminal device, and the first device is a target access device after the first terminal device moves; or receive second address update information sent by the control plane network element through a second device, where the second address update information includes the changed MAC address of the first terminal device, and the second device is a target user plane function network element after the first terminal device moves, or the second device is the target integrated device after the first terminal device moves, where the target integrated device is a device in which an access device and a user plane function network element are integrated.

Figure 15:
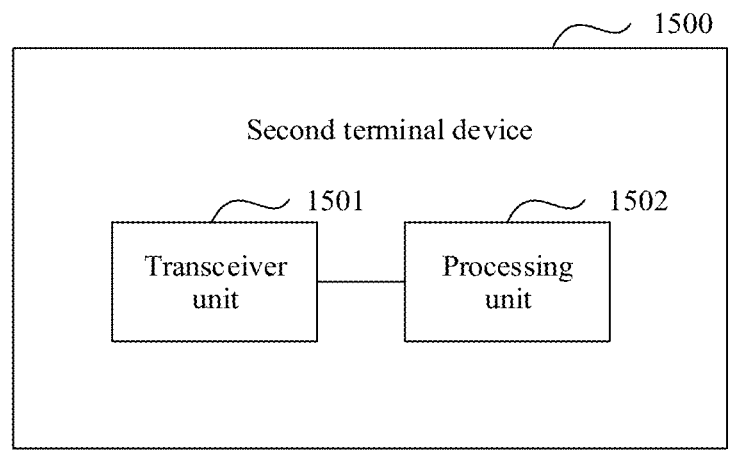
FIG. 15 is a schematic structural diagram of a second terminal device according to an embodiment.

Based on the foregoing embodiments, this embodiment of this application further provides a second terminal device. The second terminal device is configured to implement the mobility management methods shown in FIG. 4 to FIG. 11. Referring to FIG. 15, the second terminal device 1500 may include a transceiver unit 1501 and a processing unit 1502.

The transceiver unit 1501 is configured to obtain, from a control plane network element, a notification of updating to a changed MAC address of the first terminal device. The processing unit 1502 is configured to update a cached MAC address of the first terminal device to the changed MAC address of the first terminal device.

In an optional implementation, when the second terminal device is a terminal device that performs access by using a 3GPP network, the transceiver unit 1501 is specifically configured to: when obtaining, from the control plane network element, the notification of updating to the changed MAC address of the first terminal device, receive third address update information sent by the control plane network element through an access device currently accessed by the second terminal device, where the third address update information includes the changed MAC address of the first terminal device.

In an optional implementation, when the second terminal device is a terminal device that performs access by using a fixed network, the transceiver unit 1501 is specifically configured to: when obtaining, from the control plane network element, the notification of updating to the changed MAC address of the first terminal device, receive fourth address update information sent by the session management function network element through a network exposure function network element, where the fourth address update information includes the changed MAC address of the first terminal device.

In an optional implementation, when obtaining, from the control plane network element, the notification of updating to the changed MAC address of the first terminal device, the transceiver unit 1501 is specifically configured to: receive fifth address update information sent by the control plane network element through a third device, where the fifth address update information includes the changed MAC address of the first terminal device, and the third device is a user plane function network element currently accessed by the second terminal device, or the third device is an integrated device currently accessed by the second terminal device, where the integrated device is a device in which an access device and a user plane function network element are integrated.

It should be noted that, in the embodiments of this application, unit division is an example, and is merely logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The storage medium includes any medium that can store program code, such as a USB flash drive, a removable hard disk drive, a read-only memory (ROM), a random access memory (RAM), a magnetic disk, or an optical disc.

Figure 16:
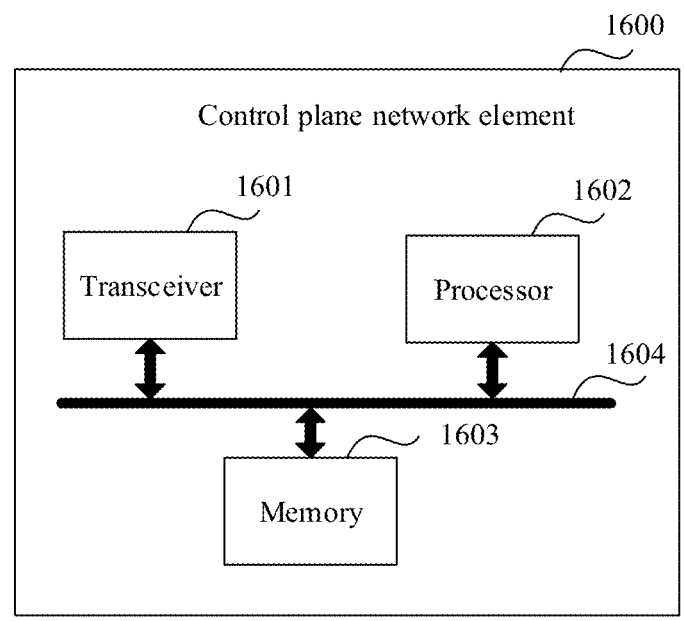
FIG. 16 is a structural diagram of a control plane network element according to an embodiment.

Based on the foregoing embodiments, an embodiment of this application further provides a control plane network element. The control plane network element is configured to implement the mobility management methods shown in FIG. 4 to FIG. 11. Referring to FIG. 16, the control plane network element 1600 includes a transceiver 1601 and a processor 1602, and optionally may further include a memory 1603.

The processor 1602 may be a central processing unit (CPU), a network processor (NP), a combination of a CPU and an NP, or the like. The processor 1602 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 1602 may implement the foregoing functions by hardware, or certainly, by hardware by executing corresponding software.

The transceiver 1601 and the processor 1602 are connected to each other. Optionally, the transceiver 1601 and the processor 1602 are connected to each other through a bus 1604. The bus 1604 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 16, but this does not mean that there is only one bus or only one type of bus.

When performing the mobility management methods in the embodiments shown in FIG. 4 to FIG. 11, the control plane network element 1600 specifically performs the following operations:

The transceiver 1601 is configured to communicate and interact with another device, to transmit and receive data.

The processor 1602 is configured to: determine a changed media access control address MAC address of a first terminal device after the first terminal device moves, determine at least one second terminal device that belongs to a same terminal device group as the first terminal device, where the first terminal device is a terminal device whose address changes after the movement, and the at least one second terminal device is a terminal device other than the first terminal device in the terminal device group, and control the transceiver 1601 to notify the first terminal device and the at least one second terminal device to update to the changed MAC address of the first terminal device.

In an optional implementation, when determining the at least one second terminal device that belongs to the same terminal device group as the first terminal device, the processor 1602 is specifically configured to: control the transceiver 1601 to query, from a group management function network element, member information of the terminal device group to which the first terminal device belongs, where the member information includes identifiers of all terminal devices included in the terminal device group, and determine the at least one second terminal device based on the member information.

In an optional implementation, when controlling the transceiver 1601 to notify the first terminal device to update to the changed MAC address of the first terminal device, the processor 1602 is specifically configured to: control the transceiver 1601 to send first address update information to the first terminal device through a first device, where the first address update information includes the changed MAC address of the first terminal device, and the first device is a target access device after the first terminal device moves; or control the transceiver 1601 to send second address update information to the first terminal device through a second device, where the second address update information includes the changed MAC address of the first terminal device, and the second device is a target user plane function network element after the first terminal device moves, or the second device is a target integrated device after the first terminal device moves, where the target integrated device is a device in which an access device and a user plane function network element are integrated.

In an optional implementation, when a second terminal device is a terminal device that performs access by using a 3GPP network, the processor 1602 is specifically configured to: when controlling the transceiver 1601 to notify the at least one second terminal device to update to the changed MAC address of the first terminal device, control the transceiver 1601 to send third address update information to the second terminal device through an access device currently accessed by the second terminal device, where the third address update information includes the changed MAC address of the first terminal device.

In an optional implementation, when a second terminal device is a terminal device that performs access by using a fixed network, the processor 1602 is specifically configured to: when controlling the transceiver 1601 to notify the at least one second terminal device to update to the changed MAC address of the first terminal device, control the transceiver 1601 to send fourth address update information to the second terminal device through a network exposure function network element, where the fourth address update information includes the changed MAC address of the first terminal device.

In an optional implementation, when controlling the transceiver 1601 to notify at least one second terminal device to update to the changed MAC address of the first terminal device, the processor 1602 is specifically configured to: control the transceiver 1601 to send fifth address update information to the second terminal device through a third device, where the fifth address update information includes the changed MAC address of the first terminal device, and the third device is a user plane function network element currently accessed by the second terminal device, or the third device is an integrated device currently accessed by the second terminal device, where the integrated device is a device in which an access device and a user plane function network element are integrated.

In an optional implementation, the processor 1602 is further configured to: initiate a procedure of releasing an original MAC address of the first terminal device, where the original MAC address of the first terminal device is a MAC address before the first terminal device moves.

The memory 1603 is configured to store a program and the like. Specifically, the program may include program code, and the program code includes computer operation instructions. The memory 1603 may include a RAM, and may further include a non-volatile memory, for example, at least one magnetic disk storage. The processor 1602 executes an application program stored in the memory 1603, to implement the foregoing functions, thereby implementing the mobility management methods shown in FIG. 4 to FIG. 11.

Figure 17:
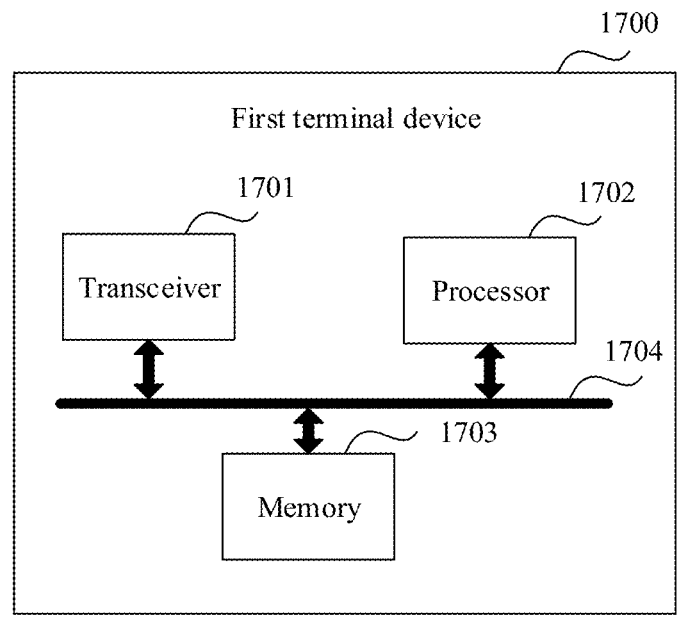
FIG. 17 is a structural diagram of a first terminal device according to an embodiment.

Based on the foregoing embodiments, an embodiment of this application further provides a first terminal device. The first terminal device is configured to implement the mobility management methods shown in FIG. 4 to FIG. 11. Referring to FIG. 17, the first terminal device 1700 includes a transceiver 1701 and a processor 1702, and optionally may further include a memory 1703.

The processor 1702 may be a CPU, an NP, a combination of a CPU and an NP, or the like. The processor 1702 may further include a hardware chip. The hardware chip may be an ASIC, a PLD, or a combination thereof. The PLD may be a CPLD, a FPGA, a GAL, or any combination thereof. The processor 1702 may implement the foregoing functions by hardware, or certainly, by hardware by executing corresponding software.

The transceiver 1701 and the processor 1702 are connected to each other. Optionally, the transceiver 1701 and the processor 1702 are connected to each other through a bus 1704. The bus 1704 may be a PCI bus, an EISA bus, or the like. The bus may be classified into an address bus, a data bus, a control bus, and the like. For ease of representation, only one thick line is used to represent the bus in FIG. 17, but this does not mean that there is only one bus or only one type of bus.

When performing the mobility management methods in the embodiments shown in FIG. 4 to FIG. 11, the first terminal device 1700 specifically performs the following operations:

The transceiver 1701 is configured to communicate and interact with another device, to transmit and receive data.

The processor 1702 is configured to: control the transceiver 1701 to obtain, from a control plane network element, a notification of updating to a changed MAC address of the first terminal device, and update a MAC address to the changed MAC address of the first terminal device.

In an optional implementation, when controlling the transceiver 1701 to obtain, from the control plane network element, the notification of updating to the changed MAC address of the first terminal device, the processor 1702 is specifically configured to:

control the transceiver 1701 to receive first address update information sent by the control plane network element through a first device, where the first address update information includes the changed MAC address of the first terminal device, and the first device is a target access device after the first terminal device moves; or control the transceiver 1701 to receive second address update information sent by the control plane network element through a second device, where the second address update information includes the changed MAC address of the first terminal device, and the second device is a target user plane function network element after the first terminal device moves, or the second device is the target integrated device after the first terminal device moves, where the target integrated device is a device in which an access device and a user plane function network element are integrated.

The memory 1703 is configured to store a program and the like. Specifically, the program may include program code, and the program code includes computer operation instructions. The memory 1703 may include a RAM, and may further include a non-volatile memory, for example, at least one magnetic disk storage. The processor 1702 executes an application program stored in the memory 1703, to implement the foregoing functions, thereby implementing the mobility management methods shown in FIG. 4 to FIG. 11.

Figure 18:
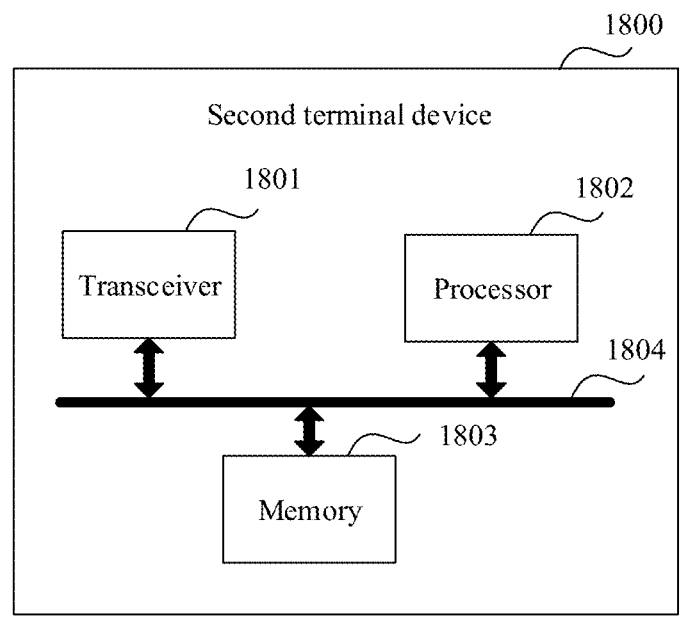
FIG. 18 is a structural diagram of a second terminal device according to an embodiment.

Based on the foregoing embodiments, an embodiment of this application further provides a second terminal device. The second terminal device is configured to implement the mobility management methods shown in FIG. 4 to FIG. 11. Referring to FIG. 18, the second terminal device 1800 includes a transceiver 1801 and a processor 1802, and optionally may further include a memory 1803.

The processor 1802 may be a CPU, an NP, a combination of a CPU and an NP, or the like. The processor 1802 may further include a hardware chip. The hardware chip may be an ASIC, a PLD, or a combination thereof. The PLD may be a CPLD, a FPGA, a GAL, or any combination thereof. The processor 1802 may implement the foregoing functions by hardware, or certainly, by hardware by executing corresponding software.

The transceiver 1801 and the processor 1802 are connected to each other. Optionally, the transceiver 1801 and the processor 1802 are connected to each other through a bus 1804. The bus 1804 may be a PCI bus, an EISA bus, or the like. The bus may be classified into an address bus, a data bus, a control bus, and the like. For ease of representation, only one thick line is used to represent the bus in FIG. 18, but this does not mean that there is only one bus or only one type of bus.

When performing the mobility management methods in the embodiments shown in FIG. 4 to FIG. 11, the second terminal device 1800 specifically performs the following operations:

The transceiver 1801 is configured to communicate and interact with another device, to transmit and receive data.

The processor 1802 is configured to: control the transceiver 1801 to obtain, from a control plane network element, a notification of updating to a changed MAC address of the first terminal device, and update a cached MAC address of the first terminal device to the changed MAC address of the first terminal device.

In an optional implementation, when the second terminal device is a terminal device that performs access by using a 3GPP network, the processor 1802 is specifically configured to: when controlling the transceiver 1801 to obtain, from the control plane network element, the notification of updating to the changed MAC address of the first terminal device, control the transceiver 1801 to receive third address update information sent by the control plane network element through an access device currently accessed by the second terminal device, where the third address update information includes the changed MAC address of the first terminal device.

In an optional implementation, when the second terminal device is a terminal device that performs access by using a fixed network, the processor 1802 is specifically configured to: when controlling the transceiver 1801 to obtain, from the control plane network element, the notification of updating to the changed MAC address of the first terminal device, control the transceiver 1801 to receive fourth address update information sent by the session management function network element through a network exposure function network element, where the fourth address update information includes the changed MAC address of the first terminal device.

In an optional implementation, when controlling the transceiver 1801 to obtain, from the control plane network element, the notification of updating to the changed MAC address of the first terminal device, the processor 1802 is specifically configured to: control the transceiver 1801 to receive fifth address update information sent by the control plane network element through a third device, where the fifth address update information includes the changed MAC address of the first terminal device, and the third device is a user plane function network element currently accessed by the second terminal device, or the third device is an integrated device currently accessed by the second terminal device, where the integrated device is a device in which an access device and a user plane function network element are integrated.

The memory 1803 is configured to store a program and the like. Specifically, the program may include program code, and the program code includes computer operation instructions. The memory 1803 may include a RAM, and may further include a non-volatile memory, for example, at least one magnetic disk storage. The processor 1802 executes an application program stored in the memory 1803, to implement the foregoing functions, thereby implementing the mobility management methods shown in FIG. 4 to FIG. 11.

In conclusion, according to the mobility management method and apparatus provided in the embodiments of this application. The control plane network element only needs to determine the MAC address of the terminal device that moves, and notify the corresponding terminal device to update, and does not need to change a MAC address forwarding table in a system, thereby flexibly switching a forwarding path, and ensuring service continuity in a movement process of the terminal device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk storage, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. The computer program instructions may be provided to a general-purpose computer, a special-purpose computer, an embedded processor, or a processor of another programmable data processing device to generate a machine, so that instructions executed by the computer or the processor of the another programmable data processing device generate an apparatus for implementing a specific function in one or more processes in the flowcharts and/or in one or more blocks in the block diagrams.

The computer program instructions may alternatively be stored in a computer-readable memory that can indicate the computer or the another programmable data processing device to work in a specific manner, so that the instructions stored in the computer-readable memory generate an artifact that includes an instruction apparatus. The instruction apparatus implements the specific function in the one or more processes in the flowcharts and/or in the one or more blocks in the block diagrams.

The computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide a step for implementing the specific function in the one or more processes in the flowcharts and/or in the one or more blocks in the block diagrams.

Obviously, a person skilled in the art can make various modifications and variations to the embodiments of this application without departing from the scope of the embodiments of this application. This application is also intended to cover these modifications and variations of the embodiments of this application provided that they fall within the scope defined by the claims of this application and their equivalent technologies.

What is claimed is:

1. A mobility management method, applied to a scenario in which a first terminal device moves, the method comprising:
    determining, by a control plane network element, a changed media access control (MAC) address of the first terminal device after the first terminal device moves;
    determining, by the control plane network element, at least one second terminal device that belongs to a terminal device group as the first terminal device, wherein the first terminal device is a terminal device whose address changes after the movement, and the at least one second terminal device is a terminal device other than the first terminal device in the terminal device group; and
    notifying, by the control plane network element, the first terminal device and the at least one second terminal device to update to the changed MAC address of the first terminal device, wherein notifying the first terminal device to update to the changed MAC address of the first terminal device comprises:
    sending, by the control plane network element, first address update information to the first terminal device through a first device, wherein the first address update information comprises the changed MAC address of the first terminal device, and the first device is one of a target access device serving the first terminal device after the first terminal device moves, a target user plane function network element serving the first terminal device after the first terminal device moves, and a target integrated device serving the first terminal device after the first terminal device moves, wherein the target integrated device is a device in which an access device and a user plane function network element are integrated.

2. The method according to claim 1, wherein determining the at least one second terminal device comprises:
    querying, by the control plane network element from a group management function network element, member information of the terminal device group to which the first terminal device belongs, wherein the member information comprises identifiers of all terminal devices comprised in the terminal device group; and
    determining, by the control plane network element, the at least one second terminal device based on the member information.

3. The method according to claim 1, wherein when a second terminal device in the at least one second terminal device is a terminal device that performs access by using a 3GPP network, notifying the at least one second terminal device to update to the changed MAC address of the first terminal device comprises:
    sending, by the control plane network element, second address update information to the second terminal device through an access device currently accessed by the second terminal device, wherein the second address update information comprises the changed MAC address of the first terminal device.

4. The method according to claim 1, wherein when a second terminal device in the at least one second terminal device is a terminal device that performs access by using a fixed network, notifying the at least one second terminal device to update to the changed MAC address of the first terminal device comprises:
    sending, by the control plane network element, third address update information to the second terminal device through a network exposure function network element, wherein the third address update information comprises the changed MAC address of the first terminal device.

5. The method according to claim 1, wherein notifying the at least one second terminal device to update to the changed MAC address of the first terminal device comprises:
    sending, by the control plane network element, fourth address update information to a second terminal device in the at least one second terminal device through a second device, wherein the fourth address update information comprises the changed MAC address of the first terminal device, and the second device is one of a user plane function network element currently accessed by the second terminal device, and an integrated device currently accessed by the second terminal device, wherein the integrated device is a device in which an access device and a user plane function network element are integrated.

6. The method according to claim 1, wherein the method further comprises:
    initiating, by the control plane network element, a procedure of releasing an original MAC address of the first terminal device, wherein the original MAC address of the first terminal device is a MAC address before the first terminal device moves.

7. A control plane network element, applied to a scenario in which a first terminal device moves, and comprising:
    a processor, configured to:
        determine a changed media access control (MAC) address of the first terminal device after the first terminal device moves; and
        determine at least one second terminal device that belongs to a terminal device group as the first terminal device, wherein the first terminal device is a terminal device whose address changes after the movement, and the at least one second terminal device is a terminal device other than the first terminal device in the terminal device group; and
    a transmitter, configured to, in coordination with the processor notify the first terminal device and the at least one second terminal device to update to the changed MAC address of the first terminal device, wherein the transmitter is further configured to:

send first address update information to the first terminal device through a first device, wherein the first address update information comprises the changed MAC address of the first terminal device, and the first device is one of a target access device serving the first terminal device after the first terminal device moves, a target user plane function network element serving the first terminal device after the first terminal device moves, and a target integrated device serving the first terminal device after the first terminal device moves, wherein the target integrated device is a device in which an access device and a user plane function network element are integrated.

8. The control plane network element according to claim 7, wherein the processor is further configured to:
query, from a group management function network element, member information of the terminal device group to which the first terminal device belongs, wherein the member information comprises identifiers of all terminal devices comprised in the terminal device group; and
determine the at least one second terminal device based on the member information.

9. The control plane network element according to claim 7, wherein when a second terminal device in the at least one second terminal device is a terminal device that performs access by using a 3GPP network, the transmitter is specifically configured to:
send second address update information to the second terminal device through an access device currently accessed by the second terminal device, wherein the second address update information comprises the changed MAC address of the first terminal device.

10. The control plane network element according to claim 7, wherein when a second terminal device in the at least one second terminal device is a terminal device that performs access by using a fixed network, the transmitter is specifically configured to:
send third address update information to the second terminal device through a network exposure function network element, wherein the third address update information comprises the changed MAC address of the first terminal device.

11. The control plane network element according to claim 7, wherein the transmitter is specifically configured to:
send fourth address update information to a second terminal device through a second device, wherein the fourth address update information comprises the changed MAC address of the first terminal device, and the second device is one of a user plane function network element currently accessed by the second terminal device, and an integrated device currently accessed by the second terminal device, wherein the integrated device is a device in which an access device and a user plane function network element are integrated.

12. The control plane network element according to claim 7, wherein the processor is further configured to:
initiate a procedure of releasing an original MAC address of the first terminal device, wherein the original MAC address of the first terminal device is a MAC address before the first terminal device moves.

13. An apparatus, comprising:
a receiver, configured to in coordination with a processor obtain, from a control plane network element, a notification of updating to a changed media access control (MAC) address of a first terminal device; and
wherein the processor is configured to update a MAC address to the changed MAC address of the first terminal device, wherein the apparatus is for the first terminal device, wherein the receiver is further configured to:
receive first address update information sent by the control plane network element through a first device, wherein the first address update information comprises the changed MAC address of the first terminal device, and the first device is one of a target access device serving the first terminal device after the first terminal device moves, a target user plane function network element serving the first terminal device after the first terminal device moves, and a target integrated device serving the first terminal device after the first terminal device moves, wherein the target integrated device is a device in which an access device and a user plane function network element are integrated.

14. The apparatus according to claim 13, wherein the apparatus is for a second terminal device, wherein when the second terminal device is a terminal device that performs access by using a 3GPP network, the receiver is further configured to:
receive second address update information sent by the control plane network element through an access device currently accessed by the second terminal device, wherein the second address update information comprises the changed MAC address of the first terminal device.

15. The apparatus according to claim 13, wherein the apparatus is for a second terminal device, wherein when the second terminal device is a terminal device that performs access by using a fixed network, the receiver is further configured to:
receive third address update information sent by a session management function network element through a network exposure function network element, wherein the third address update information comprises the changed MAC address of the first terminal device.

16. The second terminal device according to claim 13, wherein the apparatus is for a second terminal device, wherein the receiver is further configured to:
receive fourth address update information sent by the control plane network element through a second device, wherein the fourth address update information comprises the changed MAC address of the first terminal device, and the second device is one of a user plane function network element currently accessed by the second terminal device, and an integrated device currently accessed by the second terminal device, wherein the integrated device is a device in which an access device and a user plane function network element are integrated.

* * * * *